(12) United States Patent
Martori et al.

(10) Patent No.: US 9,582,300 B2
(45) Date of Patent: Feb. 28, 2017

(54) DYNAMIC DETERMINATION OF LOCAL AND REMOTE API CALLS

(71) Applicant: StrongLoop, Inc, San Mateo, CA (US)

(72) Inventors: Ritchie Tyler Martori, Fremont, CA (US); Zhaohui Feng, Fremont, CA (US); Miroslav Bajtoš, Hradec Králové (CZ)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/490,633

(22) Filed: Sep. 18, 2014

(65) Prior Publication Data

US 2016/0077901 A1    Mar. 17, 2016

Related U.S. Application Data

(60) Provisional application No. 62/051,924, filed on Sep. 17, 2014.

(51) Int. Cl.
| | |
|---|---|
| *G06F 9/54* | (2006.01) |
| *G06F 9/455* | (2006.01) |
| *H04L 29/08* | (2006.01) |
| *G06F 21/62* | (2013.01) |
| *G06F 9/46* | (2006.01) |

(Continued)

(52) U.S. Cl.
CPC .......... *G06F 9/45529* (2013.01); *G06F 9/466* (2013.01); *G06F 9/54* (2013.01); *G06F 9/541* (2013.01); *G06F 9/547* (2013.01); *G06F 21/6236* (2013.01); *H04L 67/02* (2013.01); *H04L 67/1097* (2013.01); *H04L 67/42* (2013.01);

(Continued)

(58) Field of Classification Search
CPC .......... G06F 9/54; G06F 9/541; G06F 9/1097; G06F 9/466; G06F 9/547; G06F 9/4559; G06F 21/6236; G06F 21/335; H04L 67/1097; H04L 67/42; G04L 21/02
See application file for complete search history.

(56) References Cited

U.S. PATENT DOCUMENTS

| | | | |
|---|---|---|---|
| 6,029,231 A | 2/2000 | Blumenau | |
| 7,373,632 B1 * | 5/2008 | Kawaguchi | ............. G06F 9/465 709/203 |

(Continued)

OTHER PUBLICATIONS

Kotamraju, Jitendra, "Java API for JSON Processing: An Introduction to JSON," Jul. 2013, 3 pages, Oracle.

*Primary Examiner* — Charles E Anya
(74) *Attorney, Agent, or Firm* — Adeli LLP

(57) ABSTRACT

Some embodiments provide a system and method for dynamically determining whether to execute a function locally or remotely for an application operating on a first device. The method, while the application is operating, identifies a set of conditions the evaluation of which dynamically determines whether to (i) direct a second device to remotely process a function or (ii) locally process the function on the first device. The method evaluates the identified set of conditions on the first device. When the evaluation of the set of conditions corresponds to remote processing of the function, the method directs the second device to process the function and return a response to the first device. When the evaluation of the set of conditions corresponds to local processing of the function, the method processes the function on the first device.

34 Claims, 14 Drawing Sheets

(51) Int. Cl.
*H04L 29/06* (2006.01)
*G06F 21/33* (2013.01)

(52) U.S. Cl.
CPC ......... *G06F 21/335* (2013.01); *G06F 21/6218* (2013.01); *G06F 2221/2141* (2013.01)

(56) References Cited

U.S. PATENT DOCUMENTS

| | | |
|---|---|---|
| 9,304,796 B1 | 4/2016 | Douglas et al. |
| 2008/0313660 A1 | 12/2008 | Malik et al. |
| 2011/0016449 A1* | 1/2011 | Yao .......................... G06F 9/547 717/106 |
| 2012/0016999 A1 | 1/2012 | Kieselbach et al. |
| 2012/0089562 A1 | 4/2012 | Deremigio et al. |
| 2012/0290645 A1* | 11/2012 | Arvidsson ............... G06F 9/541 709/203 |
| 2013/0239128 A1* | 9/2013 | Dawson .................. G06F 9/548 719/320 |
| 2014/0047368 A1 | 2/2014 | Yang et al. |
| 2014/0067866 A1 | 3/2014 | Chen |
| 2014/0095324 A1 | 4/2014 | Cabral et al. |
| 2014/0122996 A1* | 5/2014 | Gupta ................... G06F 9/4443 715/234 |
| 2014/0281909 A1 | 9/2014 | Pinto et al. |
| 2014/0337467 A1* | 11/2014 | Pech ................... G06F 9/45512 709/217 |
| 2014/0372861 A1 | 12/2014 | Lawless et al. |
| 2015/0089469 A1 | 3/2015 | Shakespeare et al. |
| 2015/0229613 A1 | 8/2015 | Baum et al. |

\* cited by examiner

DYNAMIC DETERMINATION OF LOCAL AND REMOTE API CALLS

CLAIM OF BENEFIT TO PRIOR APPLICATION

This application claims benefit to U.S. Provisional Patent Application 62/051,924, filed Sep. 17, 2014, which is incorporated herein by reference.

REFERENCE TO COMPUTER PROGRAM LISTINGS

This application incorporates by reference a computer program listing appendix in an ASCII text file having a title "2014_09_18_SLOO_P0002_Appendices.txt", which includes an Appendix A portion, an Appendix B portion, and an Appendix C portion. The text file "2014_09_18_SLOO_P0002_Appendices.txt" has a size of 56347 bytes and was created on Sep. 17, 2014.

BACKGROUND

With the proliferation of mobile devices, the need for servers that can process application programming interface (API) requests from the mobile devices has never been greater. There is also a need for robust frameworks that allow developers create programs for processing such API requests on clients and on the server. Ideally, this framework would make the processing of such requests on a client or on a server seamless.

SUMMARY

Some embodiments provide a method for dynamically determining whether to execute functions of an application (e.g., application programming interface (API) requests) on either a client device (e.g., a mobile device) or a remote server (e.g., an API server). These functions are application programming interface (API) requests in some embodiments that require the retrieval and/or manipulation of data accessible through the API. In some embodiments, the application executes on the client device and individual functions of the application are processed either by the client device or the remote server depending on certain conditions assessed by the application at the client device.

In some embodiments, the conditions assessed in order to determine whether to process a particular function locally on the client device or remotely on the server include one or more of (1) the availability of a connection between the client device and the server (e.g., when a connection is unavailable, the client device processes the function); (2) a computational expense of processing the function on the client (e.g., the higher the computational expense of executing the function on the client, the more likely the application is to request that the server process the function); (3) a memory usage required to process the function on the client (e.g., the higher the memory usage on the client, the more likely the application is to request that the server process the function); and (4) local availability of the data required and the freshness of that local data (e.g., the more available and up to date the data cached on the client, the more likely the application is to process the function locally).

In addition to these infrastructure-related concerns (e.g., connection or hardware resource availability, data availability, etc.), the conditions assessed may be also be stored as explicitly defined rules in an object processed by the application. For instance, access control lists or other properties defined for an object may define policies that prevent operations from being performed on the client whenever possible. Such explicitly-defined conditions are also evaluated dynamically by the client device.

Both the server and the client application, in some embodiments, include particular data constructs that enable the functions to be processed either on the client device or on the server. In these embodiments, the client devices may process an API request locally by accessing the local data stores through an object (sometimes referred to as a proxy object) that resides on the client, or by directing the server to process this API request remotely. The proxy object in some embodiments is a JavaScript object that is constructed from a class description that is specified by a JavaScript file and a JSON file on the client. For instance, in some embodiments, the proxy objects on the client device are JavaScript objects when the proxy objects are part of an application that executes on top of a JavaScript engine of a browser on the client device. In such cases, the JavaScript and JSON files on the client device are identical or similar to the two corresponding files that are used to define the object on the remote server in some embodiments.

In other embodiments, the proxy object on a client device can be a non-JS object (e.g., a Java object or an objective C object). For instance, in some embodiments, the proxy objects on the client device are non-JavaScript objects when the proxy objects are part of an application that executes natively on top of the operating system (e.g., on top of an iOS or Android operating system) of the client device. For applications that run natively on top of a device's operating system, some embodiments do not distribute models that are defined by reference to JavaScript and JSON files. In some such embodiments, the client device includes an adapter that has the capability to query the server dynamically for models and then instantiates them as native object equivalent (e.g., as objective C objects in iOS and as Java objects in Android) at runtime.

In some embodiments, the function calls (API requests) on the client and server are identical and hence are referred to as isomorphic function calls (or isomorphic API calls). In some of these embodiments, the format of the API calls is exactly the same. In other embodiments, the format is somewhat different (e.g., when JavaScript objects are being executed on the server, while Java or Objective C objects are being executed on the clients). However, even in these embodiments, the function calls on the server and client can be isomorphic as the same set of parameters are passed along with the function call and returned from the API on the client and the server. In other words, when applications run natively on the client device operating system, the proxy object that is instantiated in the native environment represents and is an isomorphic equivalent of what is specified on the server.

In some embodiments, the remote server is a JavaScript API server that exposes its APIs (i.e., exposes its accessible objects through APIs) to the client device and other devices (e.g., other servers, computers, mobile devices, etc.) through non-proprietary web services. For instance, the server of some embodiments exposes its APIs through Representational State Transfer (REST) web services. Other embodiments expose the APIs through other services. The server of some embodiments also provides an adaptor that translates a function call from an application into an API endpoint exposed as HTTP.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE FIGURES

The novel features of the invention are set forth in the appended claims. However, for purpose of explanation, several embodiments of the invention are set forth in the following figures.

DETAILED DESCRIPTION

Figure 1:
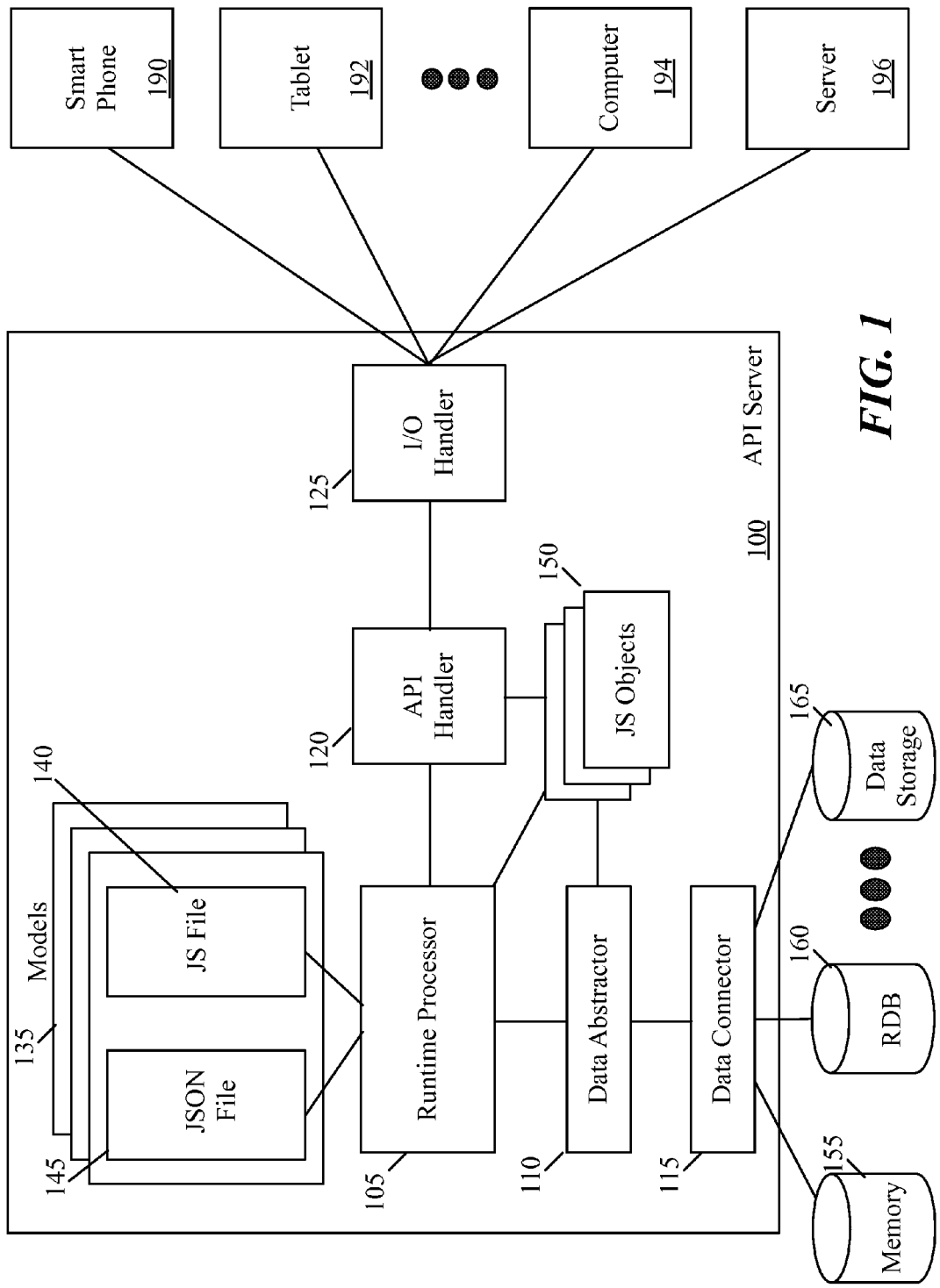
FIG. 1 illustrates a JavaScript API server of some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for dynamically determining whether to execute functions of an application (e.g., application programming interface (API) requests) on either a client device (e.g., a mobile device) or a remote server (e.g., an API server). These functions are application programming interface (API) requests in some embodiments that require the retrieval and/or manipulation of data accessible through the API. In some embodiments, the application executes on the client device and individual functions of the application are processed either by the client device or the remote server depending on certain conditions assessed by the application at the client device.

In some embodiments, the conditions assessed in order to determine whether to process a particular function locally on the client device or remotely on the server include one or more of (1) the availability of a connection between the client device and the server (e.g., when a connection is unavailable, the client device processes the function); (2) a computational expense of processing the function on the client (e.g., the higher the computational expense of executing the function on the client, the more likely the application is to request that the server process the function); (3) a memory usage required to process the function on the client (e.g., the higher the memory usage on the client, the more likely the application is to request that the server process the function); and (4) local availability of the data required and the freshness of that local data (e.g., the more available and up to date the data cached on the client, the more likely the application is to process the function locally).

In addition to these infrastructure-related concerns (e.g., connection or hardware resource availability, data availability, etc.), the conditions assessed may be also be stored as explicitly defined rules in an object processed by the application. For instance, access control lists or other properties defined for an object may define policies that prevent operations from being performed on the client whenever possible. Such explicitly-defined conditions are also evaluated dynamically by the client device.

Some embodiments of the invention provide a novel server for processing application programming interface (API) requests. In some embodiments, the API server is written in JavaScript. For examples, in some embodiments, the API-accessible objects of this server are each defined in terms of a JavaScript (JS) file and a JSON file. At runtime, a runtime processor instantiates each JavaScript object from its associated JS and JSON files. In some embodiments, a JS file and a JSON file are associated with each other through their common names.

FIG. 1 illustrates one such JavaScript API server 100 of some embodiments of the invention. This server can process API requests from a variety of devices, such as smartphones 190, tablets 192, client computers (e.g., laptops, desktops, etc.) 194, server computers 196, and other devices. As shown, this API server includes a runtime processor 105, a data abstractor 110, a data storage connector 115, an API handler 120, and an I/O handler 125. Also, as shown, this API server stores the description of multiple JavaScript models 135, with each model defined in terms of a JavaScript file 140 and a JSON file 145.

The runtime processor 105 in some embodiments instantiates a JavaScript object 150 for each model based on the object's description that is contained in its associated JavaScript model (i.e., that is contained in the JS object's associated JS file and JSON file). The Appendix A portion of the incorporated ASCII text file computer program listing appendix provides the source code within a JS framework of some embodiments that can be used to instantiate a JS object from the description of the object in a JS file and a JSON file. Once instantiated, the JavaScript object can be used to process API requests from other devices (such as mobile devices, client computers, and other server computers). These other devices will be referred to below as client devices of the API server.

To process API calls, the JS objects of some embodiments needs to exchange data with (e.g., to read from or to write to) a variety of different backend data storages 155-165 that have a variety of different interfaces. The data storage abstractor 110 and the data storage connector 115 allow these JS objects to exchange data with the backend data storages. The data storage abstractor 110 provides a layer of data abstraction between the JavaScript objects and the underlying data in the backend data storages. For instance, in some embodiments, the abstractor 110 translates the JavaScript object definitions to the object definitions of the underlying data storages. In other embodiments, the abstractor 110 simply provides a set of functions that allows the JS objects to exchange data with the backend data storages. For instance, in some embodiments, the abstractor 110 provides create, retrieve, update, and delete (CRUD) functions to connect the JS objects to the backend data storages. In these or other embodiments, the abstractor 110 can also connect to backend data storages through REST APIs, SOAP web services, and other data storage services.

The data storage abstractor 110, in some embodiments, is backed by the data storage connector 115, which implements the data exchange logic using data storage drivers or other client APIs. The JS objects also connect to backend data storages in some embodiments through a replication manager (not shown) that connects the JavaScript object to the data storage connectors and synchronizes the data between the JS object and the backend data storage. Such a replication manager is also used in some embodiments to synchronize the data between two API servers or between an API server and a client. In some embodiments, the replication manager synchronizes the data between the API server and another device (e.g., a server computer or a client device, such as a mobile device or a client computer) by synchronizing a persisted version of the IS objects that are stored on the API server and the other device.

Through the I/O manager 125, the API server in some embodiments can handle a large number of concurrent sessions with a large number of devices (e.g., computers, mobile devices, etc.). For instance, in some embodiments, this manager has a non-blocking input/output (I/O) interface that can concurrently maintain a large number of concurrent sessions. The I/O interface of some embodiments is a single-threaded process that does not consume too much of the system resources, which in turn, allows the server to be able to handle a large number of concurrent sessions. This I/O manager 125 in some embodiments can also maintain a session with a connecting device (e.g., a connecting mobile device) for a long duration of time and without interruption. In some embodiments, the I/O manager 125 can maintain a session for a long duration because it uses a web socket manager to manage the connection session.

The API handler 120 exposes the API server's JS objects 150 to the other devices (e.g., other servers 196, computers 194, and mobile devices 190 and 192). In some embodiments, the handler 120 uses non-proprietary web services to expose the APIs. For instance, the handler 120 of some embodiments exposes the JS object APIs through REST web services. Other embodiments expose the APIs through other services.

Figure 2:
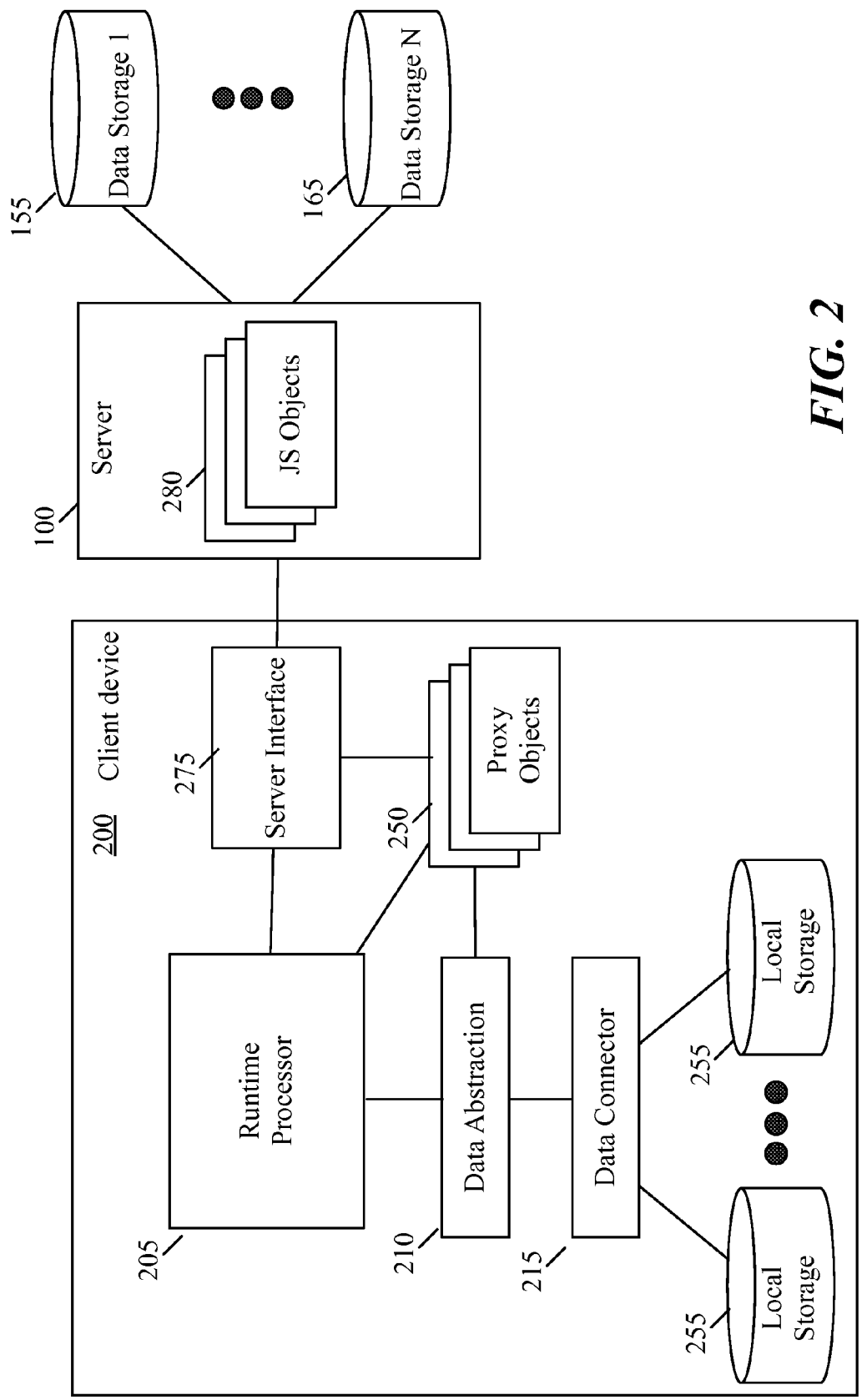
FIG. 2 presents a conceptual illustration of the API processing modules of a client device of some embodiments.

The API server of some embodiments processes API requests from client devices (e.g., mobile devices) that have the capability to process some or all of their API requests locally. FIG. 2 presents a conceptual illustration of the API processing modules of one such client device. As shown, this client device 200 has a runtime processor 205 that instantiates several proxy objects 250 that are proxies on the client device for several JS objects that operate on the API server 100.

Once instantiated, a proxy object 250 on the client can be used to process an API request from local data storages 255 that reside on the client device 200, or by calling a corresponding JS object 280 that resides on the API server 100 so that this object 280 can process this request (e.g., by using backend data storages 155-165). As further described below, the determination of whether the API request should be processed locally on the client or remotely on the server is made dynamically on the client in some embodiments. This dynamic decision is based on conditions that are dynamically assessed on the client in some embodiments.

As shown, the proxy objects 250 access the local data storages 255 through a data abstractor 210 and a data connector 215, which provide the same operations on the client device 200 as the data abstractor 110 and the data connector 115 provide on the server 100. In some embodiments, the data abstractor 210 and the data connector 215 are not used in some of the client-side environments as the objects 250 can pull data directly from the client's local storages without going through the data abstraction and connection layers. Also, the proxy object 250 accesses its corresponding JS object 280 on the API server through one or more modules that form a server interface 275. Several examples of these modules will be further described below.

In the discussion below, an object 250 on the client is referred to as a proxy object, as it can act on the client as a proxy of the object 280 on the server. As further described below, the proxy object on a client device can be a different type of object (e.g., a JS object, a Java object, or an objective C object) in some embodiments. For instance, in some embodiments, some mobile applications execute on top of a JS engine of a browser on a client device, while other mobile applications execute natively on top of the operating system of the client device. In some of these embodiments, the applications that execute on top of the browser's JS engine instantiate JS proxy objects, while the applications that run natively instantiate other types of proxy objects (e.g., Java objects or objective C objects).

In some embodiments where the proxy object is a JS object (e.g., when the proxy objects are part of an application that executes on top of a JS engine of a browser on the client device), the proxy object is constructed from a class description that is specified by a JavaScript file and a JSON file on the client. In some of these embodiments, the JS and JSON files on the client device are identical or similar to the two corresponding files that are used to define the object on the API server in some embodiments.

When the proxy object on a client device is not a JS object (e.g., it is a Java object or an objective C object that is defined to run natively on the client device's OS), some embodiments do not distribute models that are defined by reference to JS and JSON files. In some of these embodiments, the client device includes an adapter that has the capability to query the server dynamically for an object description, and then, based on the received object description, instantiate a native object (e.g., as objective C objects in iOS and as Java objects in Android) at runtime.

In some embodiments, the API calls on the client and server are identical and hence are referred to as isomorphic API calls. In some of these embodiments, the format of the API calls is exactly the same. In other embodiments, the format is somewhat different (e.g., when JavaScript objects are being executed on the server, while Java or Objective C objects are being executed on the clients). However, even in these embodiments, the APIs on the server and client can be isomorphic as the same set of parameters are passed along with the API and the same set of parameters are returned from the API on the client and the server. In other words, when applications run natively on the client device operating system, the proxy object that is instantiated in the native environment represents and is an isomorphic equivalent of what is specified on the server.

Some embodiments of the invention provide a framework for defining models by defining JS files and/or JSON files. As mentioned above, a model can be defined by an associated pair of JS file and JSON file in some embodiments. In some embodiments, the framework pre-defines one set of functions for each object that is instantiated from each model. For instance, in some embodiments, each JS object can perform the CRUD functions.

The framework of some embodiments allows additional functions to be written in the JS file in order to augment and override the set of functions of an object that is instantiated from the JS file. These additional functions can be written as hooks (e.g., function calls that are processed before or after a baseline function) that can be processed locally (e.g., on a client device) or remotely (e.g., on the server). The processing of these function calls is quite simple given the isomorphic nature of the API calls in some embodiments. The call can be made identically on a client device irrespective of whether it is going to be processed locally or remotely. The framework can determine whether to process this call locally or remotely based on pre-defined conditions for processing the call or dynamically assessed conditions for processing the call.

Figure 3:
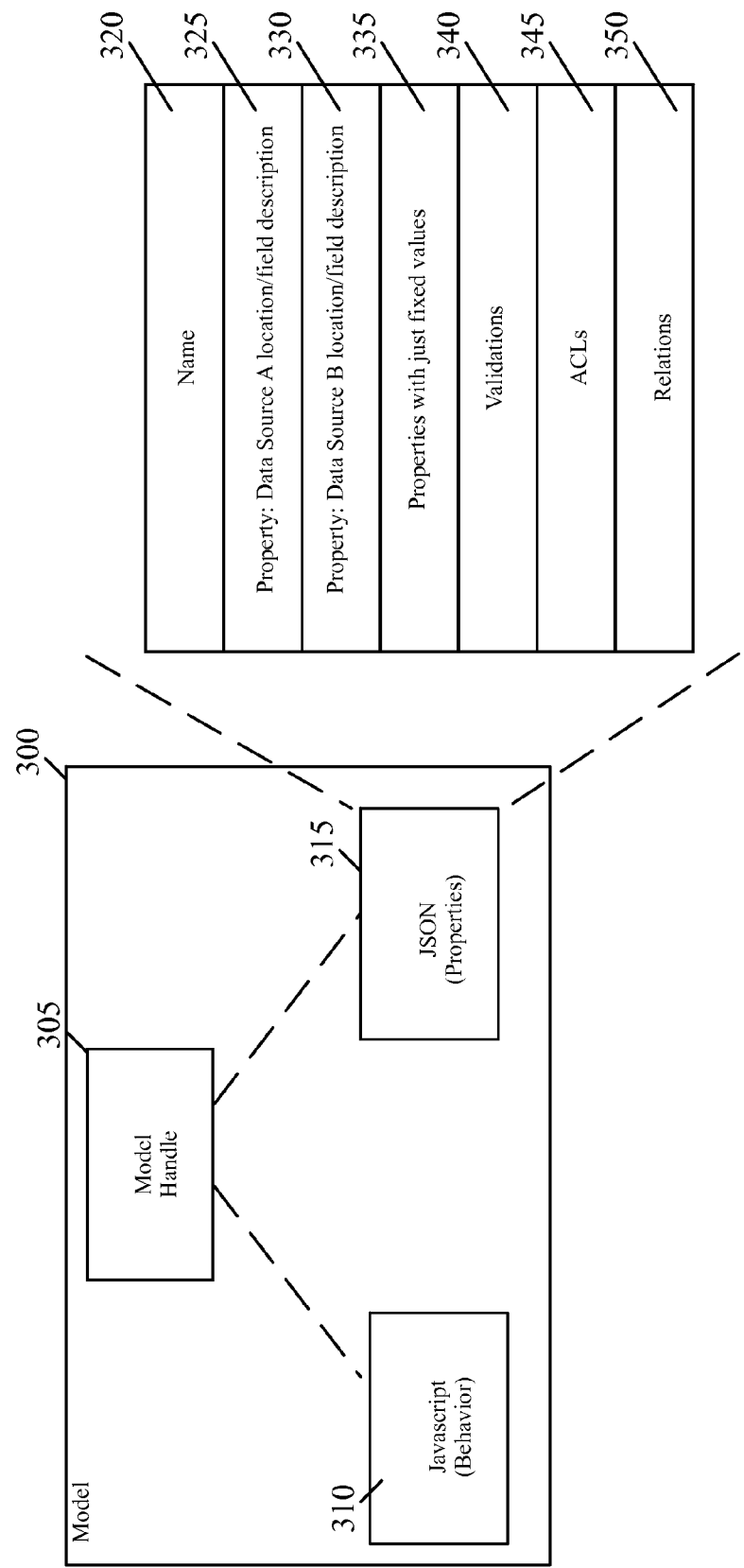
FIG. 3 illustrates a novel model description of some embodiments of the invention.

FIG. 3 illustrates a novel model description of some embodiments of the invention. This model description uses a novel JSON file structure that allows these embodiments to define rich JavaScript models. As mentioned above, each model can be instantiated at runtime to be an object that can process API requests on a client device or on a server. As shown, the model 300 in these embodiments includes (1) a high level handle 305, (2) a JavaScript file 310 that describes the behaviors of the object, and (3) a JSON file 315 that describes the attributes (e.g., the properties, relations, control logic, etc.) of the object.

As shown, besides a name key 320, the JSON file 315 of some embodiments includes (1) a rich description of properties 325 and 330 that relate to data tuples stored on data storages, (2) properties 335 that have fix values and do not relate to any data tuples stored on data storages, (3) control logics 340 and 345 for restricting access to the data tuples, and (4) relationship attributes 350 that define the relationship between the JSON file's model and other models. In some embodiments, the rich property attributes 325 and 330 of the JSON file allow a data storage to be specifically identified in terms of its location, name, and attributes, and also allows one JSON file to pull values for one or more properties from two or more data storages.

In some embodiments, the control logic 340 and 345 of a JSON file include validation rules and access control list (ACL) rules. The validation rules 340 in some embodiments ensure that the data tuples that are gathered from one or more data storages meet a required constraint that is specified for them in the rules. For instance, a validation rule might require that "Car" object have an associated VIN attribute. When a retrieved Car data tuple does not have a VIN attribute, the data tuple is not accepted as a Car because it does not meet the specified constraint for a Car.

ACL rules 345 in some embodiments ensure that the portion of a retrieved data tuple that is presented on a device satisfies certain access control criteria. For instance, an API to a bank account object might retrieve one set of values on both a computer and a mobile device. However, while the object's ACL rule might allow all of the values to be presented on the computer, the object's ACL rule might prevent some of the data values (e.g., bank account number) from being presented on the mobile device, because mobile devices might be as being inherently less secure than computers. In some embodiments, the ACLs and validation rules are implemented as hooks (i.e., function calls) that are called before or after processing the API.

The relations attribute 350 of a particular object's JSON file allows one or more links to other objects to be specified when the particular object is being instantiated.

Several examples of JSON files will now be described to further elaborate on the JSON file format of some embodiments. In some embodiments, a model is named as model-name.json, where model-name is the name of the model. For example customer.json for a customer model. The customer model's JSON file may specify the following attributes,

```
{
    "name": "Customer",
    "base": "User",
    "idInjection": false,
    "strict": true,
    "options": { ... },
    "properties": { ... },
    "validations": [...],
    "relations": {...},
    "acls": [...],
    "scopes": {...},
    "indexes" : { ...},
    "methods": [...]
}
``` where the above mentioned keys in this file, are defined as follows.

| Attribute | Type | Description |
|---|---|---|
| name | String | Name of the model.<br>Required |
| plural | String | Plural form of the model name.<br>Optional: Defaults to plural of name property using standard English conventions. |
| base | String | Name of another model that this model extends. The model will "inherit" properties and methods of the base model.<br>Required |
| idInjection | Boolean | Whether to automatically add an id property to the model:<br>true: id property is added to the model automatically. This is the default. |

| Attribute | Type | Description |
|---|---|---|
| | | false: id property is not added to the model<br>Not required |
| strict | Boolean | Specifies whether the model accepts only predefined properties or not.<br>One of:<br>  true: Only properties defined in the model are accepted. Use this<br>    mode if developer wants to make sure only predefined<br>    properties are accepted.<br>  false: The model will be an open model. All properties are accepted,<br>    including the ones that not predefined with the model. This<br>    mode is useful if the mobile application just wants to store free<br>    form JSON data to a schema-less database such as MongoDB.<br>  Undefined: Default to false unless the data source is backed by a<br>    relational database such as Oracle or MySQL. |
| options | Object | JSON object that specifies model options. |
| properties | Object | JSON object that specifies the properties in the model. |
| validation | Object | JSON object that specifies validation constrains in the model |
| relations | Object | Object containing relation names and relation definitions. |
| Acls | Array | Set of ACL specifications that describes access control for the model. |
| scopes | Object | Object that allows developer to specify commonly-used queries that the developer can reference as method calls on a model. |
| indexes | Object | Object for declaring method |
| methods | | Methods of object |

In this set of attributes, the options key specifies data source-specific options. When a model is attached to a data source of a certain type (e.g., Oracle or MySQL), a developer can specify the name of the database schema and the table as properties under the key with the name of the connector type such as below:

```
...
"options": {
  "mysql": {
    "table": "location"
  },
  "mongodb": {
    "collection": "location"
  },
  "oracle": {
    "schema": "BLACKPOOL",
    "table": "LOCATION"
  }
},
...
```

Properties key defines one or more properties. One example of a basic property definition is as follows:

```
"properties": {
  "firstName": {
    "type": "String",
    "required": "true"
  },
  "id": {
    "type": "Number",
    "id": true,
    "doc": "User ID"
  },
```

Each property that is listed under the properties key is an object that has keys described in the following table.

| Key | Required? | Type | Description |
|---|---|---|---|
| doc | No | String | Documentation for the property. |
| id | No | Boolean | Whether the property is a unique identifier. Default is false. |
| required | No | Boolean | Whether a value for the property is required. Default is false. |
| type | Yes | String | Property type. In some embodiments, can be null, Boolean, number, string, object, array, date, buffer, and GeoPoint. |
| * | No | Various | |

A model representing data to be persisted in a database usually has one or more ID properties (as identified by the "id" key) that uniquely identify the model instance. For example, the user model might have user IDs. By default, if no ID properties are defined and the idInjection property is true or is not set, since true is the default), the model builder of some embodiments automatically adds an id property to the model as follows: id: {type: Number, generated: true, id: true}. The "generated" property indicates the ID will be automatically generated by the database. If true, the connector decides what type to use for the auto-generated key. For relational databases (e.g., Oracle or MySQL), it defaults to number. If the ID is generated on the client side, it is set to false in some embodiments.

To explicitly specify a property as ID, the id property of the option should be set to true in some embodiments. The ID property value must be one of:

true: the property is an ID.
  false (or any value that converts to false): the property is not an ID (default).
  Positive number, such as 1 or 2: the property is the index of a composite ID.

In database terms, key column(s) are ID properties. Such properties are defined with the "id" attribute set to true or a number as the position for a composite key. For example,

```
{
  "myId": {
    "type": "string",
    "id": true
  }
}
```

When a model doesn't have explicitly-defined ID properties, the model builder of some embodiments automatically injects a property named "id" unless the idInjection option is set to false. If an ID property has "generated" set to true, the data storage connector decides what type to use for the auto-generated key. For example for SQL Server, it defaults to number. The data abstractor CRUD methods expect the model to have an "id" property if the model is backed by a database. A model without any "id" properties can only be used without attaching to a database.

Some embodiments allow the definition of a composite ID that has more than one property. For example, an inventory object can be defined as:

```
var InventoryDefinition = {
    productId: {type: String, id: 1},
    locationId: {type: String, id: 2},
    qty: Number
}
```

In this example, the composite ID is (productId, locationId) for an inventory model.

When using an RDB data source, some embodiments allow a developer to specify the following properties that describe the columns in the database.

| Property | Type | Description |
| --- | --- | --- |
| columnName | String | Column name |
| dataType | String | Data type as defined in the database |
| dataLength | Number | Data length |
| dataPrecision | Number | Numeric data precision |
| dataScale | Number | Numeric data scale |
| nullable | Boolean | If true, data can be null |

For example, a property can be mapped to a column in an Oracle database table, by stating the following in the JSON file:

```
"name": {
    "type": "String",
    "required": false,
    "length": 40,
    "oracle": {
        "columnName": "NAME",
        "dataType": "VARCHAR2",
        "dataLength": 40,
        "nullable": "Y"
    }
}
...
```

This is a rich description of a backend data storage and a particular data tuple field (i.e., columnName, dataType, dataLength, etc) in this storage. Providing such a rich description in a JSON file of a model is quite novel, as other prior approaches do not provide such rich attribute descriptions in JSON files.

In some embodiments, format conversions are declared in properties, per the keys in the following table:

| Key | Type | Description |
| --- | --- | --- |
| trim | Boolean | Whether to trim the string |
| lowercase | Boolean | Whether to convert a string to lowercase |
| uppercase | Boolean | Whether to convert a string to uppercase |
| format | Regular expression | Format for a date property. |

As mentioned above, the validation key specifies constraints on data with validations properties. The table below provides an example of keys that can be used to define validation constraints in the JSON file in some embodiments.

| Key | Type | Description |
| --- | --- | --- |
| default | Any | Default value of the property. |
| required | Boolean | Whether the property is required. |
| pattern | String | Regular expression pattern that a string should match |
| max | Number | Maximum length for string types. |
| min | Number | Minimum length for string types. |
| length | Number | Maximum size of a specific type, for example for CHAR types. |

One example of setting a validation constraint with such keys is provided below.

```
"username": {
    "type": "string",
    "doc": "User account name,
    "min": 6,
    "max": 24
}
```

This validation constraint states that the username has to be string, its documentation has to contain "User account name", and it has to be between 6-24 characters long. The validation class of the framework of some embodiments will be further described below.

As mentioned above, the relations key defines relationships between models through a JSON object. Each key in this object is the name of a related model, and the value is a JSON object as described in the table below. For example, the JSON file snippet below specifies that a JSON model belongs to an account model, and has a "hasMany" relationship to transaction and accessToken models.

```
"relations": {
    "accessTokens": {
        "model": "accessToken",
        "type": "hasMany",
        "foreignKey": "userId"
    },
    "account": {
        "model": "account",
        "type": "belongsTo"
    },
    "transactions": {
        "model": "transaction",
        "type": "hasMany"
    }
},
...
```

The table below provides an example of keys that can be used to define relations in the JSON file in some embodiments.

| Key | Type | Description |
| --- | --- | --- |
| model | String | Name of the related model. Required. |
| type | String | Relation type. Required.<br>One of:<br>hasMany<br>belongsTo<br>hasAndBelongsToMany<br>For hasMany, developer can also specify a hasManyThrough relation by adding a "through" key: {through: 'modelName'} |
| foreignKey | String | Optional foreign key used to find related model instances. |
| through | String | Name of model creating hasManyThrough relation. See example below. |

Example of hasManyThrough:

```
"patient": {
    "model": "physician",
    "type": "hasMany",
    "through" : "appointment"
}
```

In this example, a patient model can have many relationships with appointments through one or more physician models.

The value of an ACL key is an array of objects that describes the access controls for the model. Each object has the keys described in the table below.

```
"acls": [
    {
        "permission": "ALLOW",
        "principalType": "ROLE",
        "principalId": "$everyone",
        "property": "myMethod"
    },
    ...
]
```

The table below provides a list of keys by which an ACL key can be defined in some embodiments.

| Key | Type | Description |
| --- | --- | --- |
| accessType | String | The type of access to apply. One of:<br>READ<br>WRITE<br>EXECUTE<br>ALL (default) |
| permission | String | Type of permission granted. Required.<br>One of:<br>ALARM - Generate an alarm, in a system dependent way, the access specified in the permissions component of the ACL entry.<br>ALLOW - Explicitly grants access to the resource.<br>AUDIT - Log, in a system dependent way, the access specified in the permissions component of the ACL entry.<br>DENY - Explicitly denies access to the resource. |
| principalId | String | Principal identifier. Required.<br>The value must be one of:<br>A user ID (String\|number\|any)<br>One of the following predefined dynamic roles:<br>    $everyone - Everyone<br>    $owner - Owner of the object<br>    $related - Any user with a relationship to the object |

-continued

| Key | Type | Description |
| --- | --- | --- |
| | | $authenticated - Authenticated user<br>$unauthenticated - Unauthenticated user<br>A static role name |
| principalType | String | Type of the principal. Required.<br>One of:<br>Application<br>User<br>Role |
| property | | Specifies a property/method/relation on a given model. It further constrains where the ACL applies. |

A scopes key enables a developer to specify commonly-used queries that the developer can reference as method calls on a model. The scopes key defines one or more scopes (named queries) for models. A scope key maps a name to a predefined filter object to be used by the model's find( ) method; for example:

```
"scopes": {
    "vips": {"where": {"vip": true}},
    "top5": {"limit": 5, "order": "age"}
}
```

The snippet above defines two named queries for the model:

vips: Find all model instances with vip flag set to true top5: Find top five model instances ordered by age Within the scopes object, the keys are the names, and each value defines a filter object. In some embodiments, a developer can also define a scope programmatically using a model's scope( ) method, for example:

User.scope('vips', {where: {vip: true}});

User.scope('top5': {limit: 5, order: 'age'});

A developer can call the methods defined by the scopes in some embodiments. For example:

```
User.vips(function(err, vips) {
    ...
});
```

Methods key in the JSON file allows a developer to declare remote methods in the JSON file. Also, indexes can be declared for a model with the "indexes" option. One example of declaring indexes is as follows:

```
"indexes": {
    "name_age_index": {
        "keys": {"name": 1, "age": −1}
    },
    "age_index": {"age": −1}
}
```

The snippet above creates two indexes for the declaring model: (1) a composite index named 'name_age_index' with two keys: 'name' in ascending order and 'age' in descending order and (2) a simple index named 'age_index' with one key: 'age' in descending order. The full syntax for an index within the 'indexes' is:

```
"<indexName>": {
    "keys": {
        "<key1>": 1,
        "<key2>": -1
    },
    "options": {
        "unique": true
    }
}
```

In this syntax, '1' specifies 'ascending' while '−1' specifies 'descending'. If no 'options' are needed, developer can use a shortened form:

```
"<indexName>": {
    "<key1>": 1,
    "<key2>": -1
}
```

Indexes can be marked at model property level too, for example:

```
{
    "name": { "type": "String", "index": true },
    "email": { "type": "String", "index": {"unique": true} },
    "age": "Number"
}
```

Two indexes will be created, one for the 'name' key and another one for the 'email' key. The 'email' index is unique.

As mentioned above, one model can be defined by extending another model. The model that extends from another model will "inherit" properties and methods of the other "base" model. The following snippet provides an example of a model being extended from another.

```
var properties = {
    firstName: {type: String, required: true}
};
var options = {
    relations: {
        accessTokens: {
            model: accessToken,
            type: hasMany,
            foreignKey: userId
        },
        account: {
            model: account,
            type: belongsTo
        },
        transactions: {
            model: transaction,
            type: hasMany
        }
    },
    acls: [
        {
            permission: ALLOW,
            principalType: ROLE,
            principalId: $everyone,
            property: myMethod
        }
    ]
};
var user = loopback.Model.extend('user', properties, options);
```

The validation class, Validatable, of the framework of some embodiments will now be described. This class provides methods that add validation capabilities to models. Each of this validations run when an obj.isValid( ) method is called. Each configurator can accept n parameters (n−1 field names and one config). "Config is {Object}" depends on specific validation, but all of them have a message member property. It can be just string, when only one situation is possible, e.g., Post.validatesPresenceOf('title', {message: 'can not be blank'}). In more complicated cases it can be {Hash} of messages (for each case): User.validatesLengthOf('password', {min: 6, max: 20, message: {min: 'too short', max: 'too long'}}).

The validation class methods in some embodiments include:

Validatable.validatesPresenceOf
Validatable.validatesAbsenceOf
Validatable.validatesLengthOf
Validatable.validatesNumericalityOf
Validatable.validatesInclusionOf
Validatable.validatesExclusionOf
Validatable.validatesFormatOf
Validatable.validate
Validatable.validateAsync
Validatable.validatesUniquenessOf
validatable.isValid
ValidationError The Validatable.validatesPresenceOf method validates the presence of one or more specified properties. This method requires a model to include a property to be considered valid. The method fails when validated field is blank. For example, Post.validatesPresenceOf('title') validates presence of title.

Post.validatesPresenceOf('title', {message: 'Cannot be blank'}) provides an example with a custom message User.validatesPresenceOf('first', 'last', 'age') validates that model has first, last, and age properties:

The Validatable.validatesPresenceOf method of some embodiments has arguments and error messages as illustrated in the following tables:

| Arguments | | |
|---|---|---|
| Name | Type | Description |
| propertyName | String | One or more property names. |
| errMsg | Object | Optional custom error message. Default is "can't be blank" |

| errMsg | | |
|---|---|---|
| Name | Type | Description |
| message | String | Error message to use instead of default. |

Validatable.validatesAbsenceOf method validates absence of one or more specified properties. This method specifies that a model should not include a property to be considered valid. The Validatable.validatesAbsenceOf method fails when validated field is not blank. For example, Post.validatesAbsenceOf('reserved', {unless: 'special'}), validates absence of reserved.

The Validatable.validatesAbsenceOf method of some embodiments has arguments and error messages as illustrated in the following tables:

| Arguments | | |
|---|---|---|
| Name | Type | Description |
| propertyName | String | One or more property names. |
| errMsg | Object | Optional custom error message. Default is "can't be set" |

| errMsg | | |
|---|---|---|
| Name | Type | Description |
| message | String | Error message to use instead of default. |

Validatable.validatesLengthOf method validates the length of a property. This method requires a property length to be within a specified range. In some embodiments, the Validatable.validatesLengthOf method receives the minimum range of a property (min), the maximum range of the property (max), or the precise length of the property (is). This method returns the following default error messages:

If the length is less than minimum, the method returns
    min: too short,
If the length is more than maximum, the method returns
    max: too long, and
If the length is not equal to the received range, the method returns length is wrong Below are a few examples of how a developer can use the Validatable.validatesLengthOf method for a class (model) named "User." In the following example the method returns one of the above default error messages if an error occurs:
    User.validatesLengthOf('pas sword', {min: 7});
    User.validatesLengthOf('email', {max: 100});
    User.validatesLengthOf('state', {is: 2});
    User.validatesLengthOf('nick', {min: 3, max: 15});

A couple of more examples, for which the length validation method returns custom error messages, are as follows:
    User.validatesLengthOf('password', {min: 7, message: {min: 'too weak'}});
    User.validatesLengthOf('state', {is: 2, message: {is: 'is not valid state name'}});

The Validatable.validatesLengthOf method of some embodiments has arguments and options as illustrated in the following tables:

| Arguments | | |
|---|---|---|
| Name | Type | Description |
| propertyName | String | Property name to validate. |
| Options | Object | |

| Options | | |
|---|---|---|
| Name | Type | Description |
| is | Number | Value that property must equal to validate. |
| min | Number | Value that property must be less than to be valid. |
| max | Number | Value that property must be less than to be valid. |
| message | Object | Optional Object with string properties for custom error message for each validation: is, min, or max |

Validatable.validatesNumericalityOf method validates numericality of a property (i.e., whether the property is numerical or not). The method requires a value for property to be either an integer or number. The examples for this method are as follows:
    User.validatesNumericalityOf('age', {message: {number: ' . . . '}});
    User.validatesNumericalityOf('age', {int: true, message: {int: ' . . . '}});

The Validatable.validatesNumericalityOf method of some embodiments includes the following arguments and options:

| Arguments | | |
|---|---|---|
| Name | Type | Description |
| propertyName | String | Property name to validate. |
| Options | Object | |

| Options | | |
|---|---|---|
| Name | Type | Description |
| int | Boolean | If true, then property must be an integer to be valid. |
| message | Object | Optional object with string properties for 'int' for integer validation. Default error messages: - number: is not a number<br>int: is not an integer |

Validatable.validatesInclusionOf method validates the inclusion of a property in a set of values. The method requires a value for property to be in a specified array. For example:
    User.validatesInclusionOf('gender', {in: ['male', 'female']}), validates the gender to be either male or female.
    User.validatesInclusionOf('role', {in: ['admin', 'moderator', 'user'], message: 'is not allowed'}), validates that the user be an admin, moderator, or user, or else returns the error message "is not allowed."

The Validatable.validatesInclusionOf method of some embodiments includes the following arguments and options:

| Arguments | | |
|---|---|---|
| Name | Type | Description |
| propertyName | String | Property name to validate. |
| Options | Object | |

| Options | | |
|---|---|---|
| Name | Type | Description |
| in | Array | Array Property must match one of the values in the array to be valid. |
| message | String | Optional error message if property is not valid. Default error message: "is not included in the list". |

Validatable.validatesExclusionOf method validates the exclusion of a property. The method requires a property value not to be in a specified array. For example, Company.validatesExclusionOf('domain', {in: ['www', 'admin']}), validates that domain should not be an admin domain.

The Validatable.validatesExclusionOf method of some embodiments includes the following arguments and options:

| Arguments | | |
| --- | --- | --- |
| Name | Type | Description |
| propertyName | String | Property name to validate. |
| Options | Object | |

| Options | | |
| --- | --- | --- |
| Name | Type | Description |
| in | Array | Array Property must match one of the values in the array to be valid. |
| message | String | Optional error message if property is not valid. Default error message: "is reserved". |

Validatable.validatesFormatOf method validates the format of a property. The method requires a model to include a property that matches the given format. An example for this method is: User.validatesFormat('name', {with: /\w+/}).

The Validatable.validatesFormatOf method of some embodiments includes the following arguments and options:

| Arguments | | |
| --- | --- | --- |
| Name | Type | Description |
| propertyName | String | Property name to validate. |
| Options | Object | |

| Options | | |
| --- | --- | --- |
| Name | Type | Description |
| with | RegExp | Regular expression to validate format. |
| message | String | Optional error message if property is not valid. Default error message: "is invalid". |

Validatable.validate method validates properties using a custom validator. The default error message that this method returns in some embodiments is "is invalid." Below is an example of using this validation method:

```
User.validate('name', customValidator, {message: 'Bad name'});
function customValidator(err) {
    if (this.name === 'bad') err( );
});
var user = new User({name: 'Peter'});
user.isValid( ); // true
user.name = 'bad';
user.isValid( ); // false
```

Validatable.validateAsync method validates properties using a custom async validator. The default error message that this method returns in some embodiments is "is invalid." Below is an example of using this validation method:

```
User.validateAsync('name', customValidator, {message: 'Bad name'});
    function customValidator(err, done) {
        process.nextTick(function ( ) {
            if (this.name === 'bad') err( );
            done( );
        });
    });
var user = new User({name: 'Peter'});
user.isValid( ); // false (because async validation setup)
user.isValid(function (isValid) {
    isValid; // true
})
user.name = 'bad';
user.isValid( ); // false
user.isValid(function (isValid) {
    isValid; // false
})
```

Validatable.validatesUniquenessOf method validates uniqueness. In other words, this method ensures that the value of the property is unique in a collection of models. Below is an example of using this validation method:

```
// The login must be unique across all User instances.
User.validatesUniquenessOf('login');
// Assuming SiteUser.belongsTo(Site)
// The login must be unique within each Site.
SiteUser.validateUniquenessOf('login', { scopedTo: ['siteId'] });
```

The Validatable.validatesUniquenessOf method of some embodiments includes the following arguments and options:

| Arguments | | |
| --- | --- | --- |
| Name | Type | Description |
| propertyName | String | Property name to validate. |
| Options | Object | |

| Options | | |
| --- | --- | --- |
| Name | Type | Description |
| with | RegExp | Regular expression to validate format. |
| scopedTo | Array.<String> | List of properties defining the scope. |
| message | String | Optional error message if property is not valid. Default error message: "is not unique". |

Validatable.isValid(callback) method performs validation and triggers validation hooks in some embodiments. In some embodiments, before validation, the obj.errors collection is cleaned. Each validation then can add new errors to obj.errors collection. If collection is not blank, validation has failed. In some embodiments, this method can be called as synchronous only when no asynchronous validation is configured. Below is an example of using this validation method:

```
ExpressJS controller: render user if valid, show flash otherwise
user.isValid(function (valid) {
    if (valid) res.render({user: user});
    else res.flash('error', 'User is not valid'), console.log(user.errors),
    res.redirect('/users');
});
```

Another example:

```
user.isValid(function (valid) {
    if (!valid) {
        console.log(user.errors);
        // => hash of errors
        // => {
        // => username: [errmessage, errmessage, ...],
        // => email: ...
        // => }
    }
});
```

The validatable.isValid(callback) method of some embodiments includes the following arguments and returns:

Arguments

| Name | Type | Description |
|------|------|-------------|
| callback | Function | called with (valid) |

Returns

| Name | Type | Description |
|------|------|-------------|
| result | Boolean | True if no asynchronous validation is configured and all properties pass validation. |

ValidationError( ) method is raised when the application attempts to save an invalid model instance. Below is an example of using this validation method:

```
{
    "name": "ValidationError",
    "status": 422,
    "message": "The Model instance is not valid. \
See `details` property of the error object for more info.",
    "statusCode": 422,
    "details": {
        "context": "user",
        "codes": {
            "password": [
                "presence"
            ],
            "email": [
                "uniqueness"
            ]
        },
        "messages": {
            "password": [
                "can't be blank"
            ],
            "email": [
                "Email already exists"
            ]
        }
    },
}
```

A developer might run into situations the developer needs to raise a validation error and not rely on the system to raise the ValidationError( ). An example of such a situation is in a "before" hook or a custom model method. Below is an example of raising this method manually:

```
MyModel.prototype.preflight = function(changes, callback) {
    // Update properties, do not save to db
    for (var key in changes) {
        model[key] = changes[key];
    }
    if (model.isValid( )) {
        return callback(null, { success: true });
    }
    // This line shows how to create a ValidationError
    err = new ValidationError(model);
    callback(err);
}
```

Figure 4:
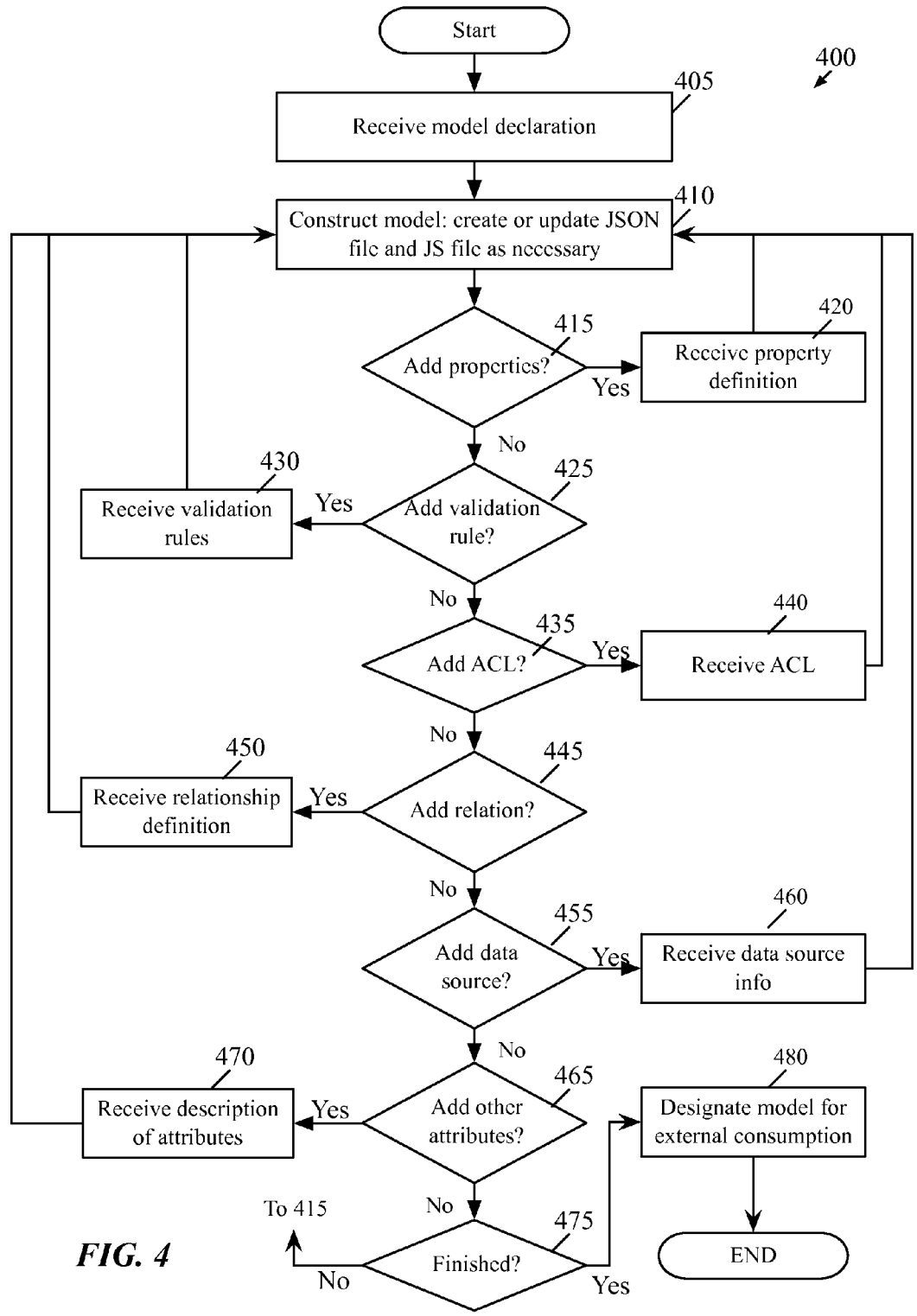
FIG. 4 presents a process that conceptually illustrates how a JavaScript model is defined in some embodiments of the invention.

FIG. 4 presents a process 400 that conceptually illustrates how a JavaScript model is defined in some embodiments of the invention. One of ordinary skill will realize that the operations illustrated in this figure can be performed in any variety of orders that differ from the order illustrated in this figure. The operational order is simply one order for performing these operations.

As shown, the process 400 initially receives (at 405) a declaration of the model. In some embodiments, the model is declared when a developer first names the model. Next, at 410, the process constructs the model by defining a JSON file and a JS file for the model. In some embodiments, the process only defines a JSON file (at 410) when the model is initially constructed. After the core model is constructed, the model in some embodiments can be designated as "common" or "abstract," and then further sub-classed to client versus server, in order to achieve isomorphic capabilities from the beginning.

After 410, the process determines (at 415) whether the user has requested the addition of a property to the JS model. If so, the process transitions to 420 to receive the property definition, and then transitions back to 410 to update the model's JSON file and/or JS file based on the received property definition. Several examples of adding properties to a model will be provided below. When the process determines (at 415) that the user has not requested that a property be added to the JS model, the process transitions to 425.

At 425, the process determines whether the user has requested the addition of a validation rule(s) to the JS model. If so, the process transitions to 430 to receive the validation rule(s) definition, and then transitions back to 410 to update the model's JSON file and/or JS file based on the received validation definition. Several examples of adding validation rules to a model were provided above, and will be further described below. When the process determines (at 425) that the user has not requested the addition of a validation rule to the JS model, the process transitions to 435.

At 435, the process determines whether the user has requested the addition of the ACL rule(s) to the JS model. If so, the process transitions to 440 to receive the ACL rule(s) definition, and then transitions back to 410 to update the model's JSON file and/or JS file based on the received ACL definition. Several examples of adding ACL rules to a model were provided above, and will be further described below. When the process determines (at 435) that the user has not requested the addition of an ACL rule to the JS model, the process transitions to 445.

At 445, the process determines whether the user has requested the addition of a relations key to the JS model. If so, the process transitions to 450 to receive the relations key, and then transitions back to 410 to update the model's JSON file and/or JS file based on the received relations key. Several examples of adding relations rules to a model were provided above, and will be further described below. When the process determines (at 445) that the user has not requested the addition of a relations rule to the JS model, the process transitions to 455.

At 455, the process determines whether the user has requested that the model be attached to a data source abstractor. As mentioned above, the data source abstractor in some embodiments enables a model to access and modify data in backend storages, such as a relational database. The data source abstractor encapsulates business logic to exchange data between models and various backend systems such as relational databases. REST APIs, SOAP web services, storage services, etc. Data source abstractors, in some embodiments, provide CRUD functions for backend data storages. As mentioned above, the data source abstractors connect the models to the data storages by using data storage connectors that are extensible and customizable. In some of these embodiments, the application code does not use a connector directly. Instead, the data source abstractor class provides an API to configure the underlying connector.

When the process determines (at 455) that the user wishes to attach the model to a data source abstractor, the process transitions to 460 to receive the data source abstractor information, and then transitions back to 410 to update the model's JSON file and/or JS file based on the received data. Several examples of attaching a model to a data source abstractor will be described below. When the process determines (at 455) that the user has not requested the attachment of the model to a data source abstractor, the process transitions to 465.

At 465, the process determines whether the user has requested the addition or modification of any other JS model attribute. Examples of such attributes include options, scopes, and indexes keys, which were described above. When the process determines (at 465) that the user has requested the addition or modification of a JS model attribute, it transitions to 470 to receive the attribute description, and then transitions back to 410 to update the model's JSON file and/or JS file based on the received attribute description. Otherwise, the process transitions to 475 to determine whether the user has finished defining the model.

When the user has not finished defining the model, the process returns to 415 to process additional user input. Otherwise, the process designates (at 480) the constructed JS model as a remotely-accessible model that can be accessed on the server by one or more other devices (e.g., client devices or severs), e.g., through a set of API requests. The process then ends. It should be noted that not all models that are created through a process like the process 400, are designated for remote access in some embodiments. Such models can be created so that they can just be accessed locally on the server or locally on a client.

As mentioned above, a developer can order the operations illustrated in FIG. 4 in any number of arbitrary sequences, after performing operations 405 and 410 initially. Also, none of the operations following 410 are mandatory. As further described below, these operations can be done through a model generator of a framework, or they can be performed programmatically through the framework's API dynamically and on demand. The Appendix B portion of the incorporated ASCII text file computer program listing appendix provides the source code of a portion of the framework of some embodiments for defining JSON-based models.

Figure 5:
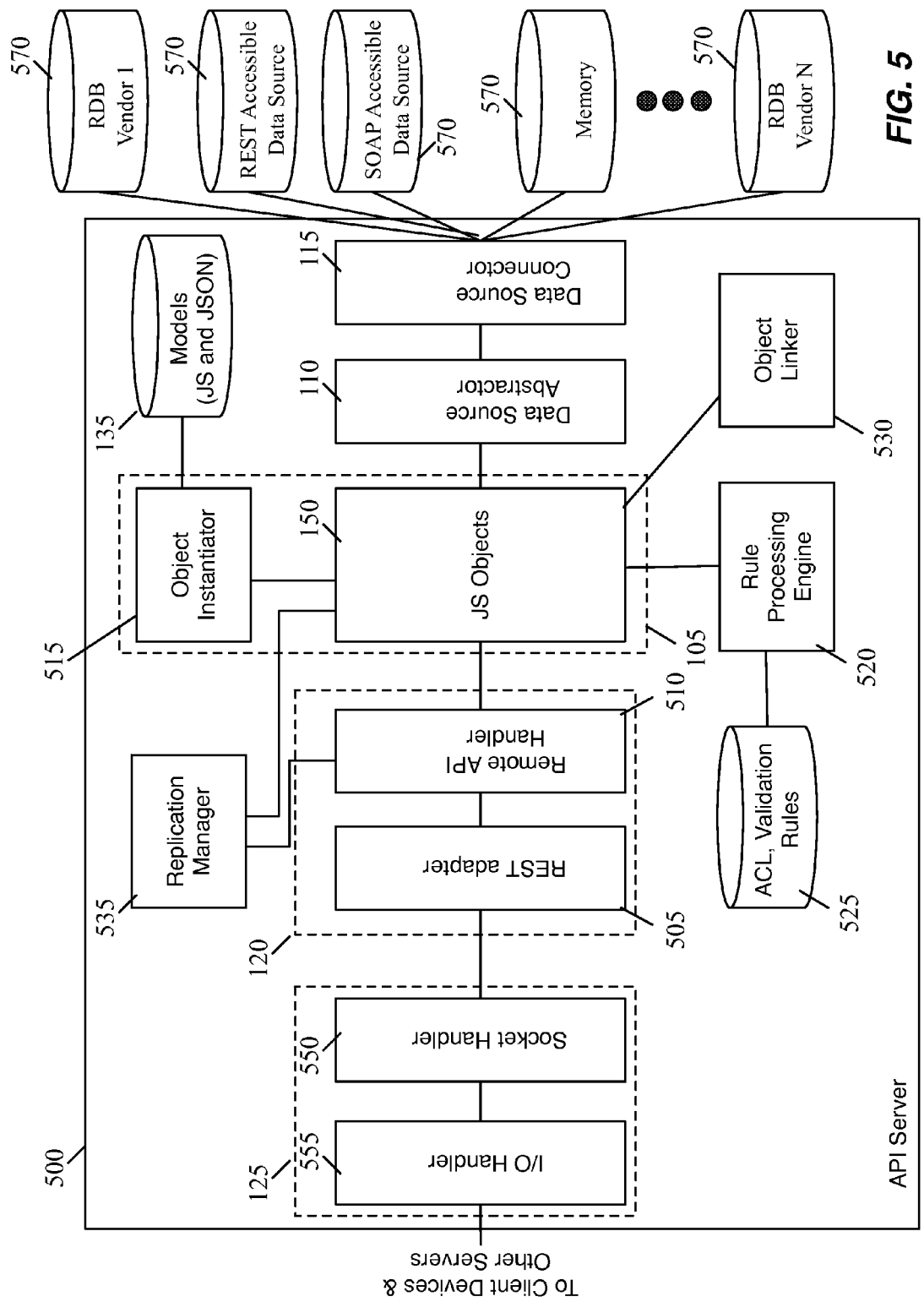
FIG. 5 illustrates a more-detailed view of a JavaScript API server of some embodiments of the invention.

FIG. 5 illustrates a more-detailed view of a JavaScript API server 500 of some embodiments of the invention. This server can process API requests from a variety of devices, such as smartphones, tablets, client computers (e.g., laptops, desktops, etc.), server computers, and other devices. This server is similar to the server 100 of FIG. 1. Like the server 100, the server 500 includes a runtime processor 105, a data abstractor 110, a data storage connector 115, an API handler 120, and an I/O manager 125. Also, like server 100, the API server 500 stores the description of multiple JavaScript models 135, with each model defined in terms of a JavaScript file and a JSON file. In FIG. 5, the API handler 120 is shown to include a REST adapter 505 and a remote API handler 510, while the I/O manager 125 is shown to include a socket handler 550 and an I/O handler 555. Similarly, the runtime processor 105 is shown to include object instantiator 515. Lastly, the API server 500 is shown to include a rule processing engine 520, ACL/Validation rule data storage 525, object linker 530, and a replication manager 535.

The runtime processor 105 in some embodiments instantiates a JavaScript object 150 for each model based on the object's description that is contained in its associated JavaScript model (i.e., its associated JaveScript file and JSON file). Once instantiated, the JavaScript object can be used to process API requests from client devices of the API server. To process API requests, the JS object might have to exchange data with one or more backend data storages 570. As before, JS objects exchange data with backend data storages through the data source abstractor 110 and connector 115, which, as mentioned above, allow the JS objects to exchange data with a variety of data storages, such as relational databases from different vendors, REST accessible data storages, SOAP accessible data storages, server memory, etc. JS objects also connect to the replication manager 535, which connects with replication managers on other servers and client devices. Through these replication managers the data that is stored in the JS objects or stored in storages for these objects can be synchronized between different servers and devices.

While instantiating the objects, the runtime processor 105 also processes the validation, ACL, and relationship attributes that are defined in the JSON files associated with the objects. This processing is different in different embodiments. In some embodiments, this processing simply entails storing the ACL, validation, and relations attributes in data storages (e.g., data storage 525), so that the rule processing engine 520 and object linker 530 can use these attributes to perform their operations. Each time that an object with validation and/or ACL rules receives an API request, the rule processing engine 520 of some embodiments performs the validation and ACL rule check for the object before or after the object processes data in response to this request. Each time an object that has relations key is instantiated, the object linker 530 creates a link between the object and other objects related to it based on relations key values.

In other embodiments, to process the validation, ACL and/or relationship attributes during a particular object's instantiation, the runtime processor instantiates a validator, ACL-rule processor, and/or an object linker for the particular object. The object linker then defines the relationships between the particular object and other objects based on the particular object's relations key values. Each time that the particular object receives an API request, the object uses its validator and/or ACL rule processor to process the validation rule(s) and/or ACL rule(s) for the particular object before or after the object processes data in response to this request. In this manner, the validator and ACL rule processor are modules that are hooked into the particular object.

The I/O handler 555 in some embodiments allows the API server to handle a large number of concurrent sessions with a large number of devices (e.g., computers, mobile devices, etc.). For instance, in some embodiments, this handler 555 uses a non-blocking input/output (I/O) process that can concurrently maintain a large number of concurrent sessions. The I/O process of some embodiments is a single-threaded process that does not consume too much of the system resources, which, in turn allows it to be able to handle a large number of concurrent sessions. In some embodiments, the socket handler 550 can also maintain a session with a connecting device (e.g., a connecting mobile device) for a long duration of time. For example, in some embodiments, the I/O manager 125 can maintain a session for a long duration because it uses a web socket manager to manage the connection session.

The API handler 120 exposes the API server's JS objects 150 to the other devices (e.g., other servers, computers, mobile devices, etc.). As shown, the handler 120 uses REST adapter to expose the APIs to the JS objects. The REST adapter handles the task of processing API requests that are received through REST web services, converting received requests to a format for the API handler 510 to process, and converting the API responses that it receives from the API handler 510 to REST web service format for transmission back to the client devices. Other embodiments expose the APIs through other services, and hence use other API protocol processors. Accordingly, in these embodiments, the REST processor is replaced with a protocol processor. This protocol processor in some embodiments can switch protocols dynamically between REST and other formats like websockets, SOAP, webrtc, etc.

As mentioned above, client devices in some embodiments instantiate objects and use these objects to process API requests locally or to direct these API requests to JS objects on an API server. In some embodiments, the client devices store the models and instantiate the objects from these models. The objects on the client devices are referred to as proxy objects, as they act on the client as proxies of the objects on the server. In some embodiments, the proxy objects are JS objects, while in other embodiments, the proxy objects are other types of objects (e.g., a Java object or an objective C object). For instance, in some embodiments, a mobile application executes within a browser on a client device, while another mobile application executes natively on top of the operating system (OS) of the client device. In some of these embodiments, the applications that execute within the browser, execute on top of the browser's JS engine. Hence, in these embodiments, the proxy objects can be JS objects. On the other hand, the application that runs natively on the device's OS, instantiates other types of proxy objects (e.g., Java objects or objective C objects) in some embodiments.

The asynchronous nature of the JavaScript poses unique challenges for traceability and debugging when programming APIs. In some embodiments the API server introduces a new construct called a zone. A zone is a special function that allows parallel execution of statements within function. The parallel execution allows for scope to be controlled and spawned independently. The function will not return a result until all statements have completed in its operation. The statement execution can be traced across the asynchronous callback boundaries within JavaScript so that each asynchronous function can be traced back to its calling parent. In addition, each functional call can carry context in the form of global data. The global data for each statement can be aggregated to the parent zone function and returned as part of the result set.

The API server uses a zone as a means to service API requests and responses across the entire lifecycle of the API invocation. This means that the zone can carry contextual information passed by the caller and have it propagated throughout all functional boundaries invoked within the API. The same zone can carry contextual information from a responding source back to the API requester as well accordingly.

Figure 6:
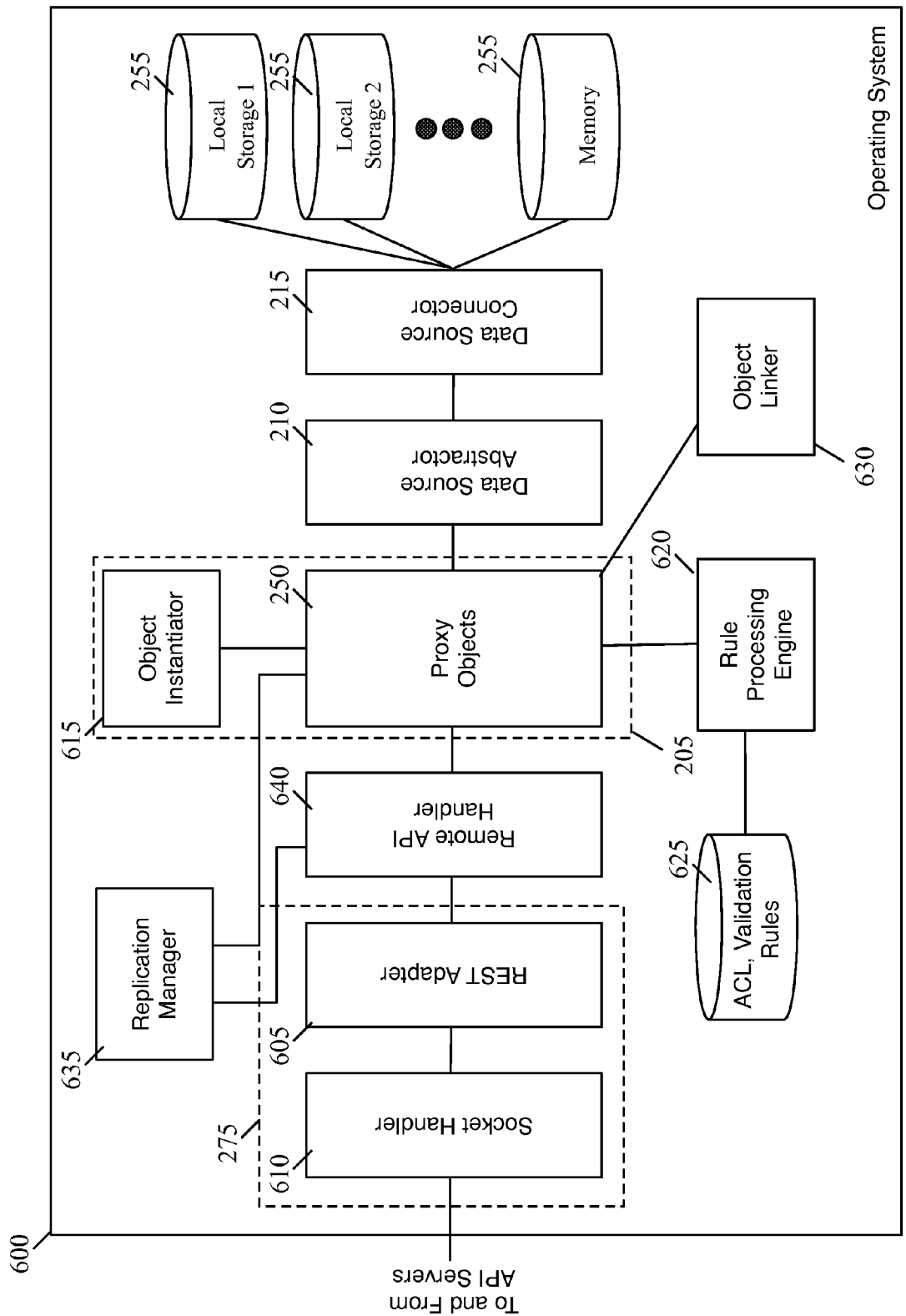
FIG. 6 conceptually illustrates executing proxy objects of some embodiments in a native OS environment of a client device.
Figure 7:
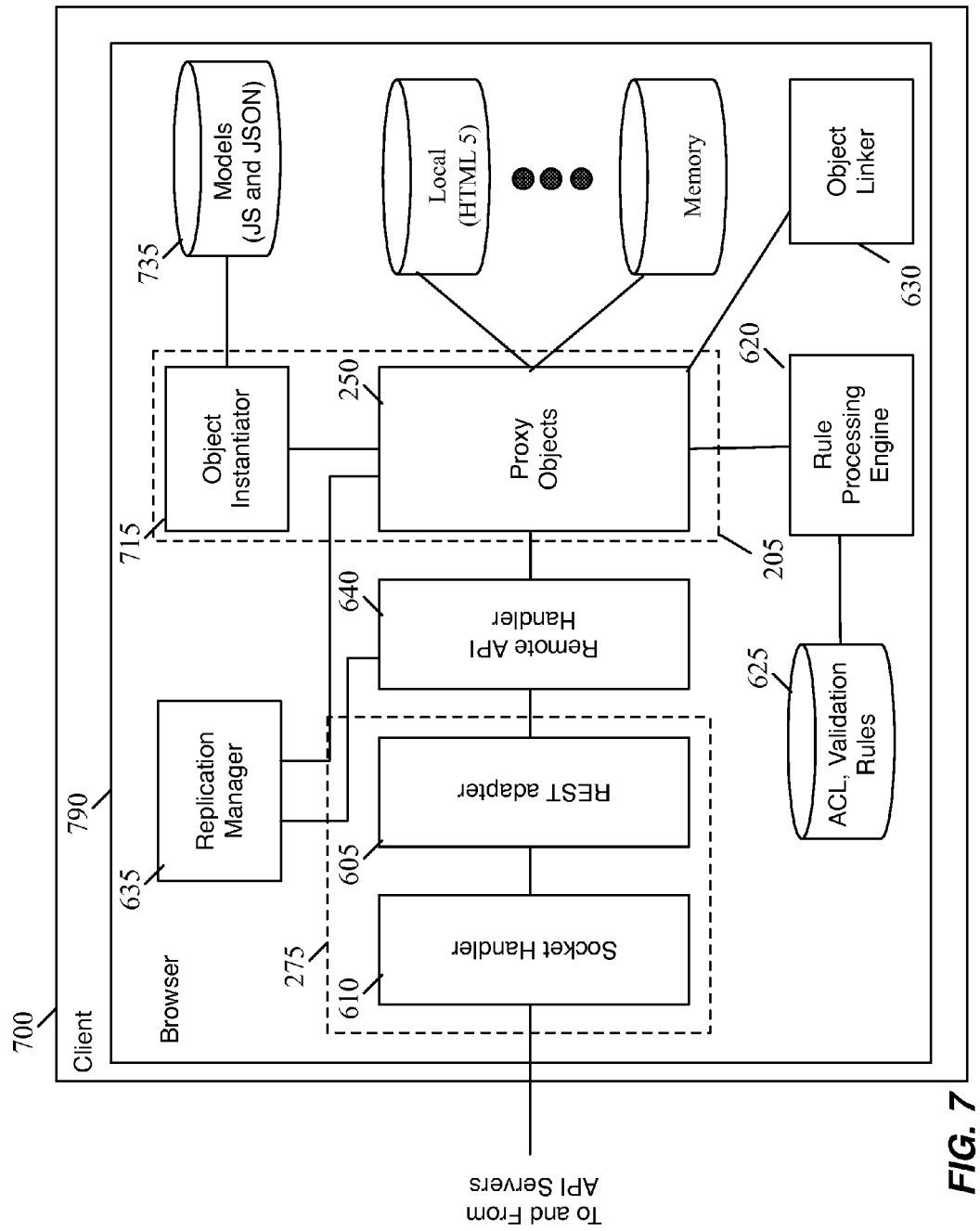
FIG. 7 conceptually illustrates executing the JS models of some embodiments within a web browser that executes on a client device.

FIGS. 6 and 7 present block diagrams that describe how the models of some embodiments can operate respectively within the browser environment and within the native OS environment of a client device. FIG. 6 conceptually illustrates executing proxy objects of some embodiments in a native OS environment of a client device 600. This environment is similar to the client environment of FIG. 2. Like the client 200, the client 600 includes a runtime processor 205, a data abstractor 210, a data storage connector 215, a server interface 275. In FIG. 6, the server interface 275 is shown to include a REST adapter 605 and a socket handler 610. Similarly, the runtime processor 205 is shown to include object instantiator 615 as well as proxy objects 250 that are created by the instantiator. Lastly, the client device 600 is shown to include a rule processing engine 620, ACL/Validation rule data storage 625, object linker 630, a replication manager 635, and a remote API handler 640.

The runtime processor 205 instantiates several proxy objects 250 that correspond to JS objects running on the API server. In some embodiments, the proxy objects are objects that can be processed in the native OS environment. Examples of such proxy objects include objective C object (e.g., for Apple iOS environment) and Java objects (e.g., for Android environment). To instantiate these proxy objects, the client device includes an adapter that can query the API server dynamically at runtime for an object description, and then, based on the received object description, instantiate a native object (e.g., as objective C objects in iOS and as Java objects in Android). In some embodiments, this adapter is part of the REST adapter 605, which acts as a bridge between client and the server. The Appendix C portion of the incorporated ASCII text file computer program listing appendix provides the source code for an adapter of some embodiments that can be used in a native client environment to pull an object's description from a server.

In some embodiments, the client device dynamically queries the API server (through the above-described adapter) for an object description when it receives an API request that it does not know how to handle. The API server in these embodiments then notes the type of client device that is making the query (i.e., notes the operating system of the client device) and then provides the object description to the client device. Once the native object is instantiated on the client, the native client can then process the API request locally, or it can direct the API request to be processed remotely by the server. In some embodiments, the API server can provide the response to the API request with the provided object description or before providing this object description.

As mentioned above, once instantiated, a proxy object 250 on the client can be used to process an API request from local data storages 255 that reside on the client device 200, or by calling a corresponding JS object that resides on the API server 100 so that this object 280 can process this request (e.g., by using backend data storages). As shown, the proxy objects 250 access the local data storages 255 through the data abstractor 210 and the data connector 215, which were described above. In some embodiments, the data abstractor 210 and the data connector 215 are not used in the native client-side environment as the proxy objects can pull data directly from the client's local data storages without going through the data abstraction and connection layers.

The proxy object 250 accesses its corresponding JS object 280 on the API server through the remote API handler 640, the REST adapter 605, and socket handler 610. The API handler 640 is part of the client-side framework that allows the proxy objects to send out API requests to the API server and to receive responses to the API requests from the API server. In some embodiments, this handler dynamically determines whether the object's API request should be processed remotely or locally. This dynamic determination is based on conditions that the handler 640 assesses dynamically in some embodiments. The dynamic decision making of the handler 640 is further described below.

The REST adapter 605 establishes REST web services between the client 600 and server 500, in order to allow these two devices to exchange API requests and responses by using the REST defined protocols. In other words, the REST adapter reformats the API requests of the proxy objects 250 to a REST-compliant format for transmission to the API server, and reformats the server's API responses from the REST-compliant format to a JS format that the JS objects can process. As mentioned above, other embodiments use other API protocol processors. The socket handler 610 maintains the communication socket(s) between the client device 600 and the API server 500. In some embodiments, the socket handler 610 establishes web sockets with the socket handler 550 of the API server 500.

While instantiating an object, the runtime processor 205 also processes the validation, ACL, and relationship attributes that are defined in the object's JSON files via the hooks that are inserted in the JS file. This processing is different in different embodiments. In some embodiments, this processing simply entails storing the ACL, validation, and relations attributes in data storages (e.g., data storage 625), so that rule processing engine 620 and object linker 630 can use these attributes to perform their operations. Each time that an object with validation and/or ACL rules receives an API request, the rule processing engine 620 in some embodiments performs the validation and ACL rule checks for the object before or after the object processes data in response to this request. Each time an object that has relations key is instantiated, the object linker 630 creates a link between the object and other objects related to it based on relations key values.

To process the validation, ACL and/or relationship attributes during a particular object's instantiation, the runtime processor of some embodiments instantiates a validator, ACL-rule processor, and/or an object linker for the particular object. The object linker 630 then defines the relationships between the particular object and other objects based on the particular object's relations key values. Each time that the particular object receives an API request, the object uses its validator and/or ACL rule processor 620 to process the validation rule(s) and/or ACL rule(s) for the particular object before or after the object processes data in response to this request. In this manner, the validator and ACL rule processor are modules that are hooked into the particular object. In some embodiments, the validator, rule processor and object linker are modules within the runtime processor. In still other embodiments, the validator and rule processor are simply functions performed by the runtime processor, while the object linker is a separate module with the runtime processor.

As shown in FIG. 6, the JS objects also connect to the replication manager 635, which connects with replication manager on the API server. Through these replication managers, the data that is stored in the JS objects or stored in storages for these objects can be synchronized between different servers and devices.

FIG. 7 conceptually illustrates executing the JS models of some embodiments within a web browser 790 that executes on a client device 700. This environment is similar to the client environment of FIG. 6, except for a few differences. For instance, all the modules illustrated operate within the browser 790. Also, as web browsers typically have a JS engine (e.g., the V8 JS engine), the object instantiator 715 instantiates JS proxy objects, as opposed to the non-JS proxy objects that are instantiated in some embodiments in the native client environments.

As shown in FIG. 7, the client 700 stores the description of multiple JavaScript models 735, with each model defined in terms of a JavaScript file and a JSON file. In some embodiments, the client-side JS and JSON files are identical or similar to the JS and JSON files that are used to define the object on the API server. The object instantiator 715 instantiates each JS, proxy object based on the object description contained in an associated pair of JS file and JSON file. In some embodiments, a JS file and a JSON file are associated through their common name.

In FIG. 7, the proxy objects 250 are shown to directly access the local storage of the browser without having to using the data abstractor 210 or the data connector 215, which were illustrated in FIG. 6 for the native client environment. However, as mentioned above, the native client environment also does not utilize the data abstractor 210 and the data connector 215 in some embodiments.

The framework of some embodiments provides a Zone library that provides a way to represent the dynamic extent of asynchronous calls in JS framework of some embodiments. The zone library dynamically modifies framework's asynchronous APIs at runtime. Similar to how a scope of a function defines where it may be used, the extent of a call represents the lifetime that it is active. The Zone library of some embodiments also provides execution context that can persist across the lifecycle of one or more asynchronous calls. This concept is similar to the concept of thread-local data in Java. In some embodiments, the Zones library provides a way to group and track resources and errors across asynchronous operations. In addition zones (1) enable more effective debugging by providing better stack traces for asynchronous functions, (2) make it easier to write and understand asynchronous functions for the applications, (3) make it easier to handle errors raised asynchronously and avoid resulting resource leaks, and (4) enable the developers to associate user data with asynchronous control flow.

In some embodiments, in order to use the zones that are provided in the Zone library, the developer should add the "require('zone').enable( )" as the very first line of the developer's program. By doing so, the zone library exports a global variable, zone. The zone global variable always refers to the currently active zone. In some embodiments, the methods that can always be found on the 'zone' object are actually static methods of the Zone class, so they don't do anything with the currently active zone. After loading the zone library, the developer's program has entered the 'root' zone.

Different embodiments provide different ways to create a zone. The canonical way to create a one-off zone is as follows:

```
// Load the library
require('zone').enable( );
// MyZone is the name of this zone which shows up in stack traces.
zone.create(function MyZone( ) {
    // At this point the 'zone' global points at the zone instance ("MyZone")
    // that we just created.
});
```

The above zone constructor function is called synchronously.

A simple way to create a function that is always wrapped within a zone is as follows:

```
function renderTemplate(fileName, cb) {
    zone.create(function( ) {
        // Actual work here
        ...
    }).setCallback(cb);
}
```

To make the above function a little less verbose, some embodiments provide the 'zone.define( )' API. With this API, the developer can wrap a function such that when the function is called a zone is created. For example:

```
var renderTemplate = zone.define(function(fileName, cb) {
    zone.setCallback(cb);
    // Actual work here
    ...
});
```

This zone template now can be used as follows:

```
renderTemplate('bar', function(err, result) {
    if (err)
        throw err;
    // Do something with the result
    ...
});
```

Zones of some embodiments are like asynchronous functions. From the outside perspective, they can return a single value or "throw" a single error. Some embodiments provide a couple of ways for the outside zone to obtain the result of a zone. When a zone reports its outcome, in some embodiments, no more callbacks will run inside the zone. Additionally all non-garbage-collectable resources are cleaned up when a zone reports its outcome. Zones of some embodiments, also automatically exit when no explicit value is returned. One way to obtain the outcome of a zone, in some embodiments, is:

```
require('zone').enable( );
var net = require('net');
zone.create(function MyZone( ) {
    // This runs in the context of MyZone
    net.createConnection(...);
    fs.stat(...)
    if (Math.random( ) < 0.5)
        throw new Error('Chaos monkey!');
    else if (Math.random( ) < 0.5)
        zone.return('Chaos monkey in disguise!');
    else
        ; // Wait for the zone to auto-exit.
}).setCallback(function(err, result) {
    // Here we're back in the root zone.
    // Asynchronicity is guaranteed, even if the zone returns or
    throws immediately.
    // By the time we get here we are sure:
    // * the connection has been closed one way or another
    // * fs.stat has completed
});
```

The developer can also use the then and catch methods, as if it were a promise:

```
zone.create(function MyZone( ) {
    // Do whatever
}).then(function(result) {
    // Runs when successful
}).catch(function(err) {
    // Handle error
});
```

Within a zone, a developer may use resources that are "owned" by ancestor zones. Therefore in some embodiment the following is proper:

```
var server = http.createServer( ).listen(1234);
server.listen(1234);
zone.create(function ServerZone( ) {
    // Yes, allowed.
    server.on('connection', function(req, res) { ... });
    // Totally okay
    process.stdout.write('hello!');
});
```

However, using resources owned by child zones is not allowed:

```
var server;
zone.create(function SomeZone( ) {
    server = http.createServer( ).listen(1234);
});
// NOT OKAY!
server.on('connection', function( ) { ... });
```

Some embodiments allow for a zone to temporarily enter an ancestor zone. Some such embodiments, however, do not allow for the zone to enter child zones, siblings, etc. The rationale behind this is that when a zone is alive its parent must also be alive. Other zones may exit unless they are aware that code will run inside them. An example is illustrated below:

```
zone.create(function OuterZone( ) {
    var childZone = zone.create(function ChildZone( ) {
        ...
    });
    // Fine.
    zone.parent.run(function( ) {
        console.log('Hello from the root zone!');
    });
    // NOT ALLOWED
    childZone.run(function( ) {
        console.log('Weird. This isn't supposed to work!');
    });
});
```

Some embodiments provide the following ways to explicitly exit a zone:

zone.return(value) sets the return value of the zone and starts cleanup.

zone.throw(error) sets the zone to failed state and starts cleanup. zone.throw, itself, does not throw, so statements after it will run.

throw error uses normal exception handling. If the exception is not caught before it reaches the binding layer, the active zone is set to failed state and starts cleanup.

zone.complete(err, value) is a zone-bound function that may be passed to subordinates to let them exit the zone.

The following example,

```
zone.create(function StatZone( ) {
  fs.stat('/some/file', function(err, result) {
    if (err)
      throw err;
    else
      zone.return(result);
  });
});
is equivalent to:
zone.create(function StatZone( ) {
  fs.stat('/some/file', zone.complete);
});
```

In some embodiments, in order to run code in a child zone, a developer can use zone.bindCallback and zone.bindAsyncCallback functions to create a callback object which can be invoked from a parent zone. A developer can also, within a zone, use resources that are "owned" by ancestor zones of that zone. Therefore, the following example is proper:

```
var server = http.createServer( ).listen(1234);
server.listen(1234);
zone.create(function ServerZone( ) {
```

```
// Yes, allowed.
server.on('connection', function(req, res) { ... });
// Totally okay
process.stdout.write('hello!');
});
```

However, using resources owned by child zones is not allowed, therefore the following example is not proper:

```
var server;
zone.create(function SomeZone( ) {
  server = http.createServer( ).listen(1234);
});
// NOT OKAY!
server.on('connection', function( ) { ... });
```

The framework of some embodiments provide a very useful property "prozone.data" which is a property that associates arbitrary data with a zone. This property can be thought as the 'scope' of a zone. Properties that are not explicitly defined within the scope of a zone are inherited from the parent zone. In some embodiments, zone.data equals the global object in the root zone. In these embodiments, zone.data starts off as an empty object with the parent zone's data property as it's prototype in any other zone.

The example provided below shows a very simple case where zones can (1) store user provided data with different lifetimes, (2) capture unexpected Exceptions in asynchronous callbacks, and (3) provide a long stack-trace of exceptions:

```
js require('zone').enable( ); express = require('express'); var Zone = zone.Zone;
var app = express( ); var router = express.Router( ); Zone.longStackSupport = true;
//Initialize the Request id in the root zone. //This value will be available to all child zones.
zone.data.requestId = 0;
app.use(function(req, res, next) { //Increment the request ID for every new request
++zone.data.requestId;
//Create a new Zone for this request zone.create( function RequestZone( ) { //Store the
request URL in the Request zone //This value will be only to this zone and its children
zone.data.requestURL = req.url;
    //Continue to run other express middleware within this child zone
    next( );
  })
  .then(
    //The call was successful
    function successCallback(err) {
      res.write('Transaction successful\n');
      res.end( );
    },
    //An error was thrown while processing this request
    function errorCallback(err) {
      res.write('Transaction failed\n');
      res.write('x' + err.zoneStack + '\n');
      res.end( );
    });
});
router.get('/', function(req, res) { if (Math.random( ) > 0.5) { //Simulate some async I/O
call that throws an exception process.nextTick(function( ) { throw new Error("monkey
wrench"); }); }
res.write('Running request #' + zone.data.requestId + ' within zone: ' + zone.name + '
(URL:' + zone.data.requestURL + ')\n'); });
app.use('/', router); app.listen(3001);
```

Some embodiments provide a method for dynamically determining whether to execute functions of an application (e.g., application programming interface (API) requests) on either a client device (e.g., a mobile device) or a remote server (e.g., an API server). These functions are application programming interface (API) requests in some embodiments that require the retrieval and/or manipulation of data accessible through the API. In some embodiments, the application executes on the client device and individual functions of the application are processed either by the client device or the remote server depending on certain conditions assessed by the application at the client device.

In some embodiments, the conditions assessed in order to determine whether to process a particular function locally on the client device or remotely on the server include one or more of (1) the availability of a connection between the client device and the server (e.g., when a connection is unavailable, the client device processes the function); (2) a computational expense of processing the function on the client (e.g., the higher the computational expense of executing the function on the client, the more likely the application is to request that the server process the function); (3) a memory usage required to process the function on the client (e.g., the higher the memory usage on the client, the more likely the application is to request that the server process the function); and (4) local availability of the data required and the freshness of that local data (e.g., the more available and up to date the data cached on the client, the more likely the application is to process the function locally).

In addition to these infrastructure-related concerns (e.g., connection or hardware resource availability, data availability, etc.), the conditions assessed may be also be stored as explicitly defined rules in an object processed by the application. For instance, access control lists or other properties defined for an object may define policies that prevent operations from being performed on the client whenever possible. Such explicitly-defined conditions are also evaluated dynamically by the client device.

Figure 8:
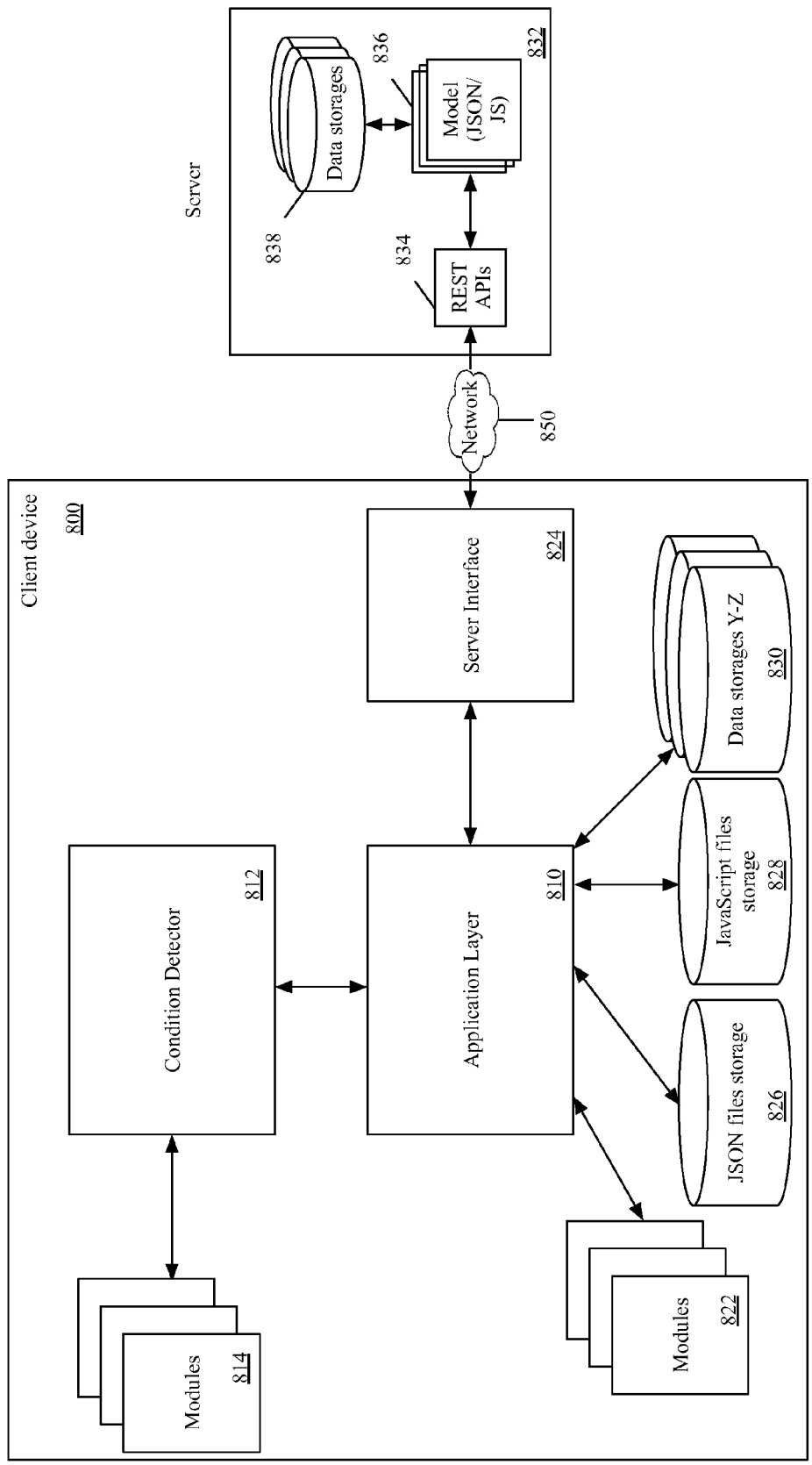
FIG. 8 illustrates a client device of some embodiments that runs an application that utilizes a strong remoting feature.

In some embodiments, as mentioned, an application operating on the client device implements one or modules that enable this dynamic determination as to whether to execute a function locally or remotely (a feature sometimes referred to herein as "strong remoting"). FIG. 8 illustrates a client device 800 that runs an application that utilizes this strong remoting feature. In some embodiments, the client device 800 is a mobile device (e.g., a smart phone, tablet, etc.), a laptop, or other device.

As shown, operating on the client device 800 is an application layer 810, a condition detector 812, a first set of modules 814 utilized by the condition detector 812, a second set of modules 822 utilized by the application layer 810, and a server interface 824. Also shown are various data storages residing on the client device 800, including JSON files storage 826, JavaScript files storage 828, and additional data storages 830. As mentioned, the JavaScript and JSON files 828 and 826 are present for applications that execute on top of a JavaScript engine of a browser on the client device in some embodiments. However, for applications that operate natively on the client device, the JavaScript/JSON files are not present, and the objects are instantiated at runtime as native object equivalents of the JavaScript/JSON objects.

FIG. 8 also includes a server 832 operating remotely from the client device, with REST APIs 834, JSON/JavaScript models 836, and data storages 838. One of ordinary skill in the art will recognize that these various sets of data may be stored in temporary volatile storage (e.g., random access memory) or more permanent forms of storage (e.g., solid-state storage, disk storage, etc.). In addition, the data may be stored in different formats. For instance, the data storages 830 might include database records stored in a cache in some embodiments, while the data storages 830 might be stored in other formats (e.g., data structures for storing conditions in RAM). The server 832 is communicatively connected to the server interface 824 of the client device 800 through a network 850. This network may be a proprietary network or a public network (e.g., a network of networks such as the Internet).

In some embodiments, the application layer 810 implements an application (or applications) based on JavaScript files 828 and JSON files 826. In some embodiments, the application layer 810 is a JavaScript runtime processor that parses JavaScript and JSON code in these files in order to implement the application functions defined by these files. The runtime processors of some embodiments were described above. In some embodiments, the application layer includes an object linker that links the functions in the JavaScript files to the object descriptions in the JSON files. This allows the functions, which may include functions that determine whether to call a different function on the client or the remote server, to be automatically bound to the objects (i.e., the JSON objects) at runtime. Examples of such an object linker were described above.

The application layer also includes an object instantiator to generate objects from the JavaScript and JSON files in some embodiments. The object instantiators of some embodiments were described above. In some embodiments, the application layer 810 is a module in a different programming language/system (e.g., objective C for mobile devices running the iOS® operating system from Apple Inc.®, Java for mobile devices running the Android™ operating system, etc.).

The application layer 810 may use the data storages 830 when performing functions locally in some embodiments. In some embodiments, the data storages 830 include database records or other information previously retrieved from an API server (e.g., the server 832) and cached locally. When performing a local API call (e.g., when the condition detector specifies to invoke a function locally), the application layer 810 retrieves the requested data from the local data storages 830. In addition to the JavaScript files 828, the application layer 810 of some embodiments may access one or more additional modules 822 in order to perform various actions on the client device not specified in the JavaScript/JSON models (i.e., functions that do not relate to the objects instantiated based on the JavaScript/JSON models). In some embodiments, the application layer 810 connects to the data storages 830 through a data source abstractor and/or a data source connector.

As indicated, the JavaScript/JSON models may specify API function calls that can be executed locally or with a remote call to an API server. In some embodiments, the models include hooks before some of these API calls that specify to determine whether the function should be performed locally or remotely by using the condition detector 812. In different cases, the hook may frame the function call to the condition detector 812 in different ways. For instance, an application may prefer to execute a particular function remotely in order to request data from an API server, and therefore effectively ask the condition detector 812 whether a remote call is possible. On the other hand, for a different function, the application (or a different application) may prefer to execute the particular function locally using the locally cached data, and therefore effectively ask the condition detector 812 whether a local call is possible. Still other functions may not have a preference built into the application, and instead ask the condition detector 812 to determine whether a local or remote call is better. In some embodiments, the call to the condition detector 812 specifies conditions required for either sending a remote API call or executing a function locally. In some embodiments, the condition detector 812 is a module of a remote API handler (e.g., remote API handler 640 of FIGS. 6 and 7).

The condition detector 812 of some embodiments compares the conditions specified by the application (i.e., conditions specified by the JavaScript/JSON model) with the actual state of the client device. In some embodiments, these conditions may be specified by a JavaScript file or by a JSON file linked to the JavaScript file. The condition detector 812 determines whether these specified conditions are met, and therefore, whether the application should execute the function call remotely via a request to the API server or execute the function call locally. In some embodiments, the condition detector 812 returns a decision (i.e., execute remotely or execute locally), while in other embodiments the condition detector 812 returns a yes/no answer as to whether a specified set of conditions are met. Though shown separately, in some embodiments the condition detector is actually part of the application layer, as it is another function called by the application as defined in the JavaScript/JSON files (or, for natively operating applications, in the dynamically instantiated native object equivalents).

In some embodiments, the condition detector 812 uses the set of modules 814 and/or data from the data storages 830 to determine whether the specified conditions are met. The modules 814, in some embodiments, provide the condition detector 812 with data indicating one or more of (1) the status of a connection to the server (e.g., available or unavailable, and/or the speed and/or quality of the connection if available), (2) the processing load of one or more processors of the client device, and (3) the amount of free memory of the client device. In some embodiments, the condition detector determines whether the data needed by the API call is present and/or updated recently enough. In some embodiments, the condition detector 812 connects to the data storages 830 through the data source abstractor and/or a data source connector, as indicated above for the application layer 810.

Upon receiving the response from the condition detector 812, the application layer 810 (e.g., implementing a JavaScript/JSON model) either invokes the API call in question locally on the client device 800 or remotely on the server 832. In some embodiments, the server interface 824 handles the actual interactions with the API server 832 (and other API servers to which the application(s) may connect for other requests). Examples of one or more modules (e.g., the REST adapter, socket handler, I/O handler, etc.) that form the server interface 824 of some embodiments were described above.

The client device 800 connects to the server 832 through a network 850 (e.g., one or more of a local area network, cellular network, the Internet, etc.). The server 832 provides REST APIs 834 that allow the server to interpret remote calls to have the server implement function as requested by the client device 800. The REST APIs 834 access the models 836 which in turn may access various data storages 838 to retrieve data in response to the remotely-called API request. Several examples of API server of some embodiments were described above.

Figure 9:
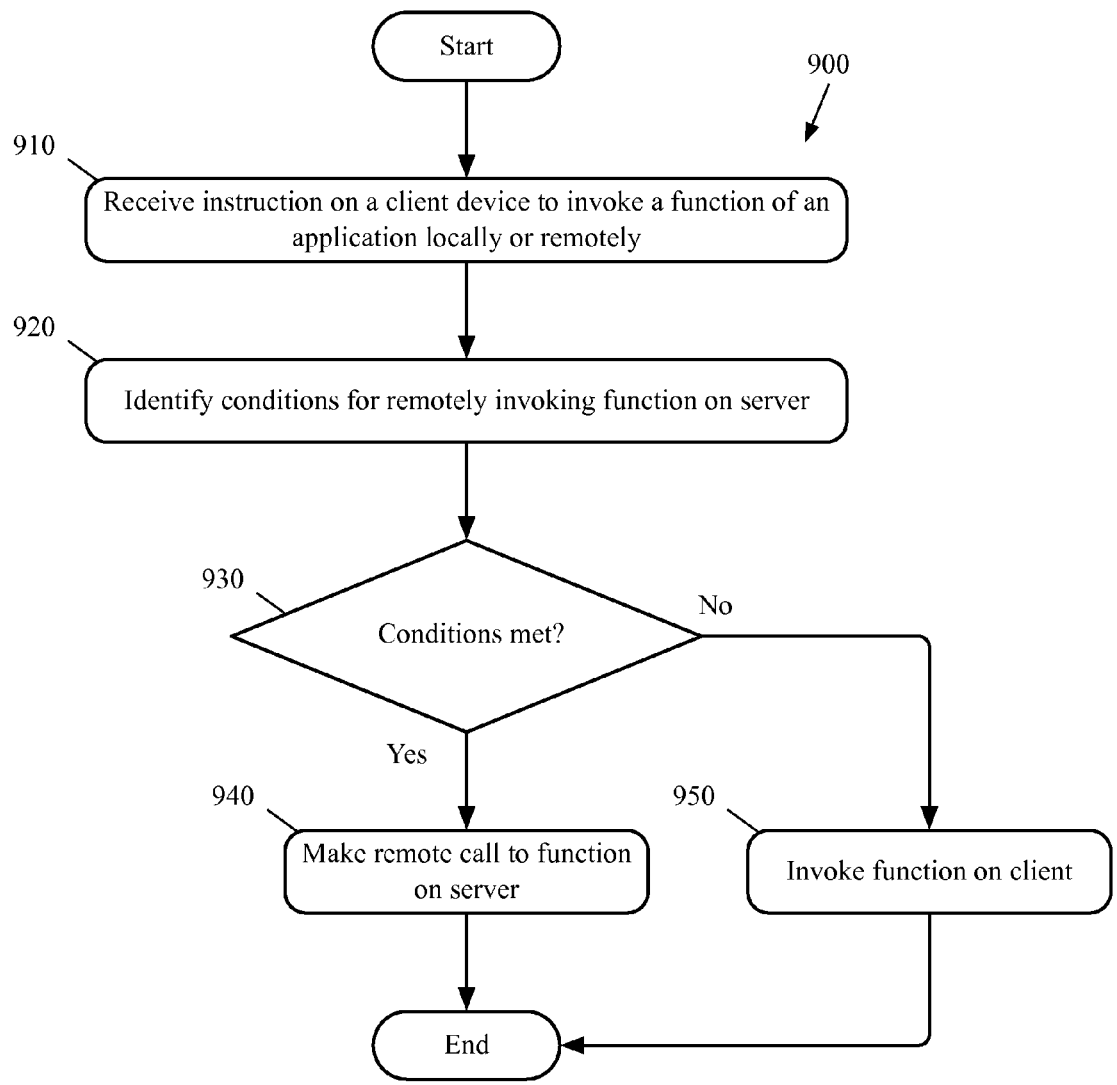
FIG. 9 conceptually illustrates a process of some embodiments for determining whether to process a function on either a server or a client device.

The operation of the application layer 810 and its use of the condition detector 812 in some embodiments will be described by reference to FIG. 9. FIG. 9 conceptually illustrates a process 900 of some embodiments for determining whether to process a function on either a server or a client device. In some embodiments, the process is performed by the client device, and thus the process determines whether to execute the function locally or remotely. In some embodiments, the function is an API call for an object that requests or modifies data about the object in one or more data storages, which may have both local and remote (e.g., on an API server) incarnations. Examples of client devices include smart phones, tablets, laptop computers, desktop computers, other servers, etc.

As shown, the process 900 receives (at 910) an instruction on a client device to invoke a function of an application locally or remotely. In some embodiments, the function is an API request that is invoked by an application. The application code (e.g., a JavaScript file or JavaScript/JSON model) may include a hook, or interceptor call, that requests a dynamic determination on whether to invoke the API request locally or remotely. That is, the application makes a first call to determine whether to invoke the function locally or remotely (based on, e.g., a set of current operating conditions), then dynamically uses the result of this determination to invoke one of two function calls embedded in the code.

The process 900 then identifies (at 920) a set of conditions that determine whether to remotely invoke the function on a server (e.g., an API server). One of ordinary skill in the art will recognize that this is merely a conceptual example process, and in some embodiments the process instead identifies a set of conditions for invoking the function locally. For example, in some embodiments, the hook that results in the dynamic determination as to whether to process the function locally or remotely passes a set of conditions for performing the function remotely. If these conditions are met, then the application will send a remote function call to the server, whereas if the conditions are not met, then the application invokes the function with a local call. Similarly, in some embodiments, the hook passes a set of conditions for performing the function locally, and only if these conditions are met will the application invoke the function with a local call; otherwise, the application sends a remote function call to the server. In some embodiments, this set of conditions (for either remotely or locally processing the function) is stored in a JSON file, or is part of a JavaScript program (e.g., as parameters passed by a function call to the condition detector).

In some embodiments, the conditions that determine whether to process a function on the client device or the server may include conditions relating to data availability, as well as operating conditions such as software conditions, hardware conditions, or network conditions. One such condition in some embodiments is an availability of a connection between the client device and the server. In order for such a connection to be available, the client device must be able to connect to a network, the network conditions must be such as to allow data to pass between the client device and the server and the server must be operating and able to use the network, etc. In some embodiments, when a connection between the client device and the server is unavailable, the client device processes the function to the best of its ability. However, processing the function may result in incomplete data when necessary data is not available on the client device.

Some embodiments examine the computational expense of processing the function on the client device as a condition for determining whether to remotely call the function or locally invoke the function. In general, high computation cost functions (e.g., when processing the function requires a very large number of mathematical calculations) will be offloaded to a server, if possible, rather than run on a mobile device (e.g., a device in which high computational costs may cause the device to drain its battery too quickly). Thus, some embodiments use a preference for a remote call for such functions, so long as certain minimal other conditions are met (e.g., that the network connection to the server is available).

Some embodiments include as testable conditions certain aspects of the current operating conditions on the device. For example, in some embodiments the current processing load of the client device CPU (e.g., from other applications, etc.) and/or the current memory usage. The client device, particularly mobile devices, often have less CPU power and/or memory available than a server, especially when sharing those hardware resources with other applications running on the device. When the current CPU usage and/or current memory usage on the client device is higher, the application will be more likely to use a remote function call rather than further taxing the client device. This threshold for when to make a remote function call may be lower, in some embodiments, for functions that are known to be more computationally expensive or which will use more memory.

In some cases, even when other conditions are favorable to implementing a function on a device (e.g., low computational cost, low memory usage, etc.) the data necessary or desirable for implementing the function might be unavailable on the client device. When such a condition exists, the application is more likely to command the server to process the function rather than the client device. Similarly, even when a version of the data is available in a local data cache of the client device, the data may be out of date. Therefore in some embodiments, freshness of the data can be a condition that determines whether to implement a function on a server or a client device. In such cases, most applications will be biased toward implementing the function on the server if cached data on the device is stale (see e.g., FIG. 10A-10D, below).

In addition, in some embodiments the JSON file (or the native object equivalent) may include properties that specify that certain actions should be performed on either the client or server. For instance, the properties specified in the JSON file for an object might specify that certain actions may only be performed on the server for security purposes, and thus the condition detector effectively dynamically determines whether the function may be performed at all (i.e., if the function cannot be performed remotely, then do not call the function).

Figure 10A:
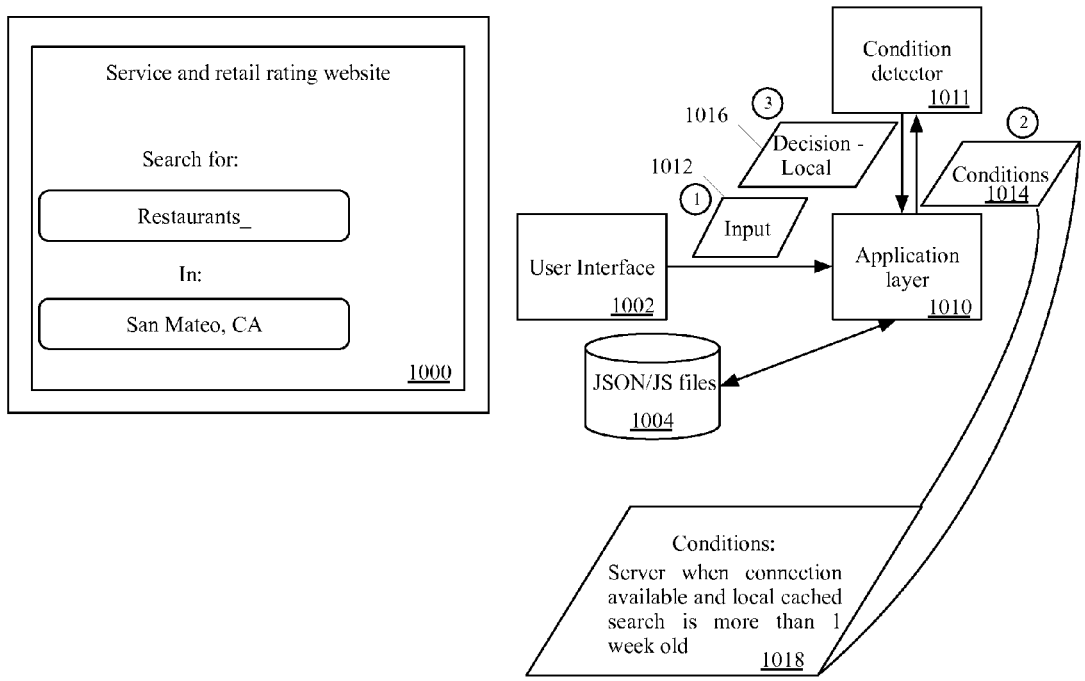
FIGS. 10A-D illustrate an example of a browser-based application of some embodiments dynamically determining whether to execute functions of some embodiments locally (on a client device) or remotely (on a server), and the subsequent execution of those functions.
Figure 10B:
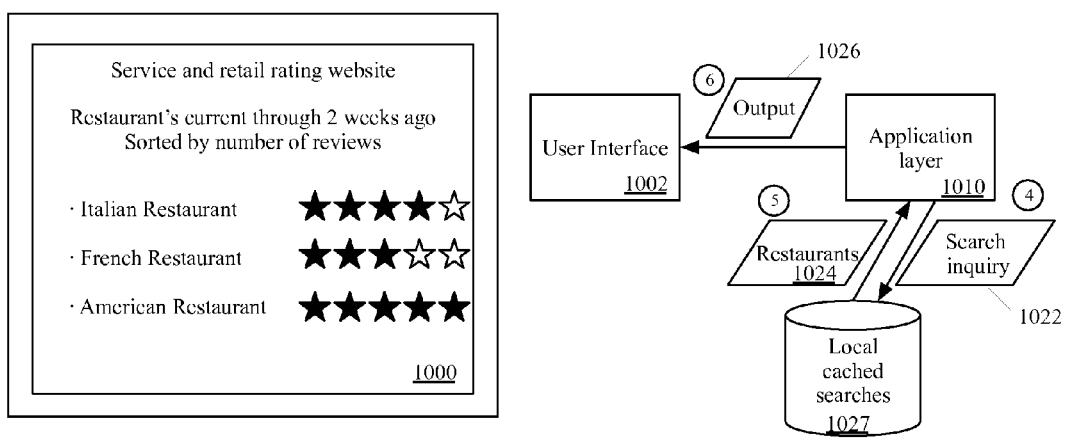
Figure 10C:
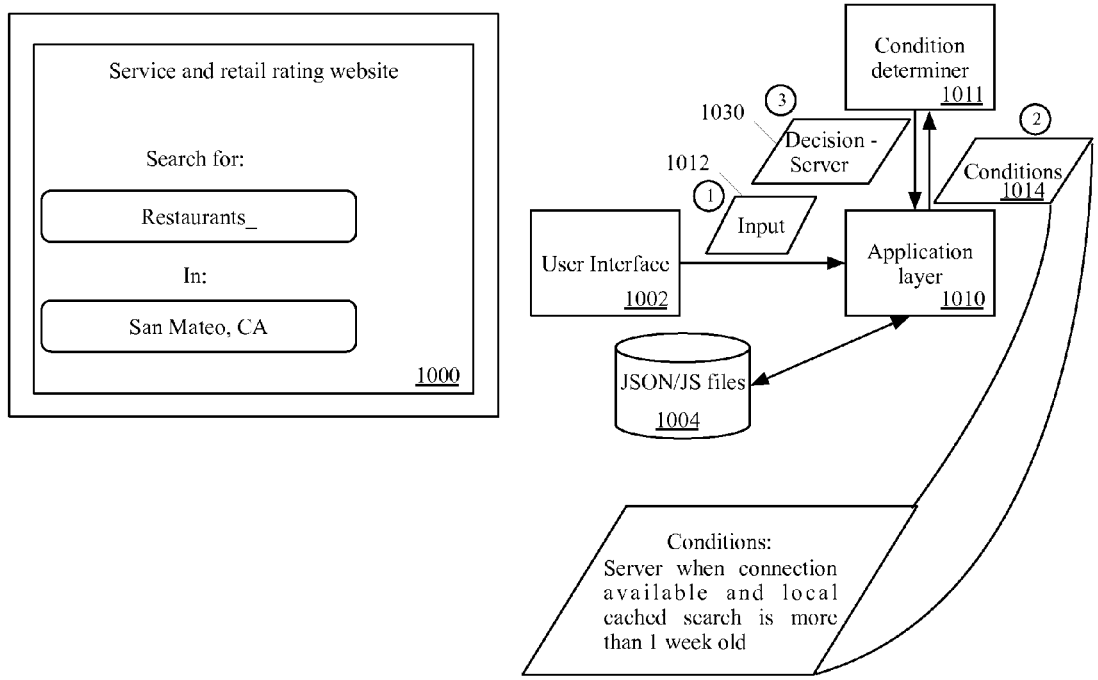
Figure 11A:
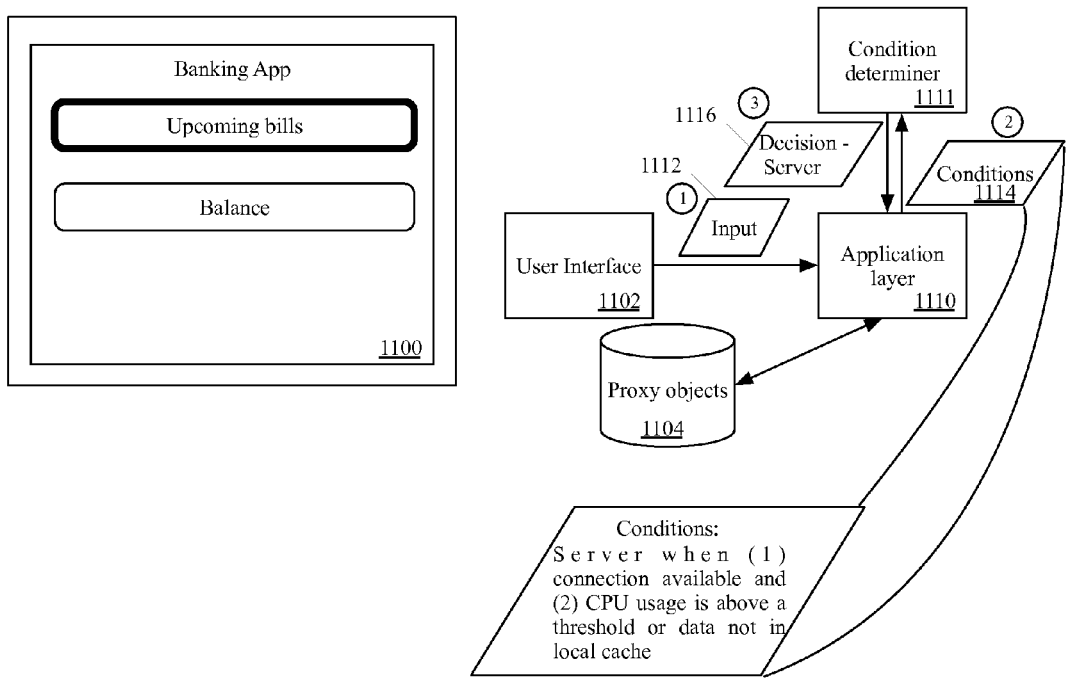
FIGS. 11A-D illustrate an example of a non-browser-based application of some embodiments dynamically determining whether to execute functions of some embodiments locally (on a client device) or remotely (on a server), and the subsequent execution of those functions.
Figure 11B:
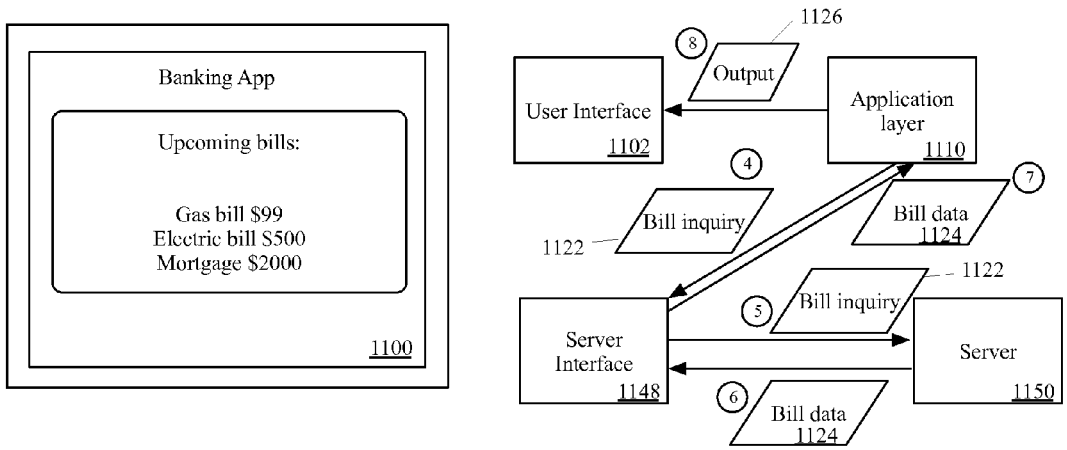
Figure 11C:
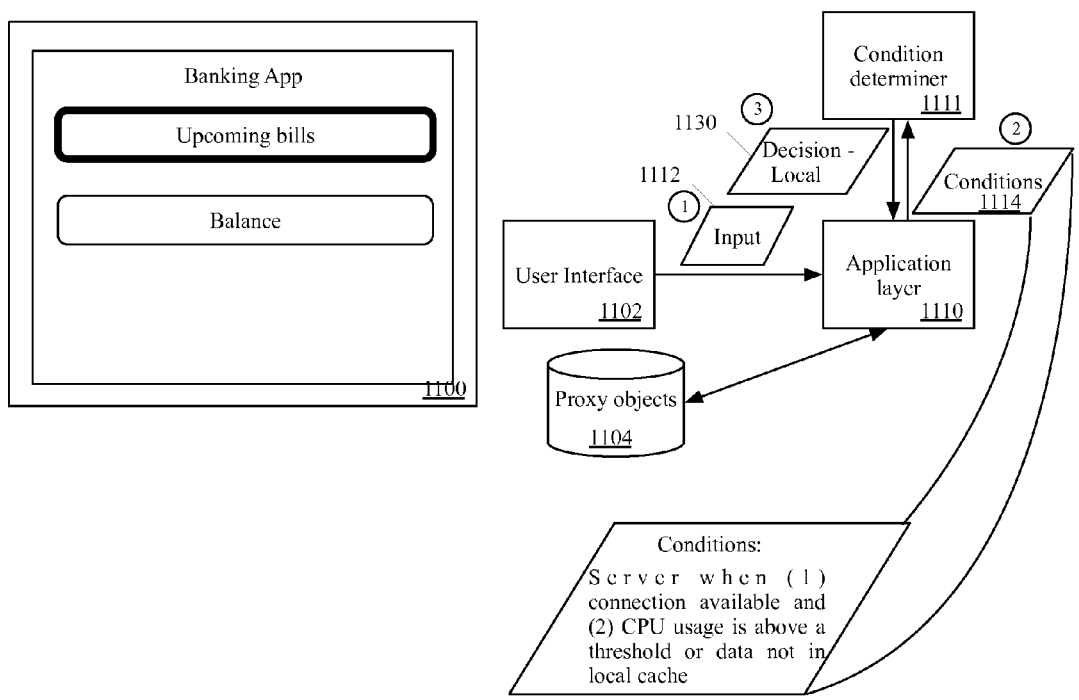

The process 900 determines (at 930) whether the conditions for calling the function on the server are met. As mentioned above, in other embodiments the conditions to be met may be those for calling the function locally. In some embodiments, the determination is made by comparing the set of conditions (e.g., defined in a JSON file) against data about the current operating conditions provided by one or more data storages and/or one or more modules (as shown above by reference to FIG. 8). For example, if a condition depends at least partly on whether certain data is cached locally on the client device, then the process would determine whether that data is cached (e.g., in a data storage) on the client device and the newness of the cached data. Similarly, if a condition depends on an analysis of available computing resources on the client device, or whether there is an available connection to the server, the process 900 of some embodiments uses one or more modules to determine the actual state of the client device to compare to the set of conditions provided in the JSON file. FIGS. 10A and 11C, below, provide examples of conditions that result in an application calling a remote function on a server. FIGS. 10C and 11A, on the other hand, provide examples of conditions that result in an application invoking a function on a client device.

Figure 10D:
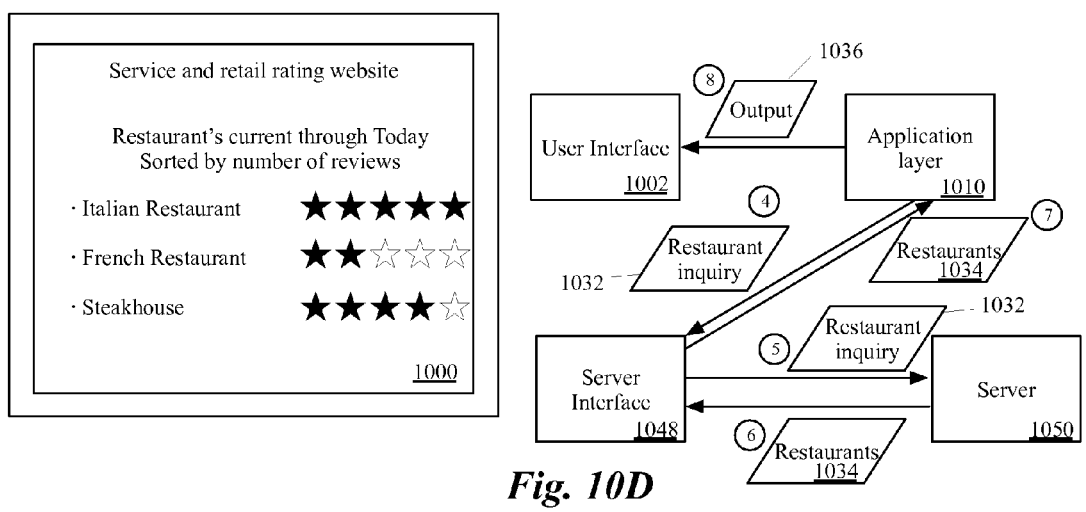
Figure 11D:
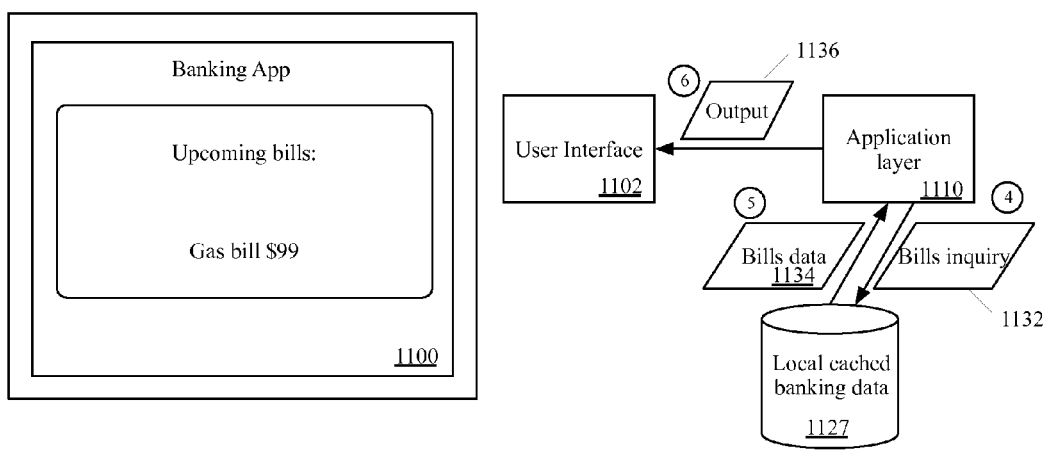

When the conditions are met, the application makes (at 940) a remote call to the function on the server. In some embodiments, the remote call to the function on the server is performed over a network and through REST APIs on a server (e.g., network 850 through REST APIs 834 on server 832 of FIG. 8). FIGS. 10D and 11B, below, provide examples of remote calls to a server. When the conditions for making a remote call to a function on a server are not met, the application invokes (at 950) the function on the client device. In some embodiments, invoking the function on the client device includes accessing modules on the client device and/or data storages on the client device (e.g., modules 822 and/or data storages 830 of FIG. 8). FIGS. 10B and 11D provide examples of invoking a function on a client device. In some embodiments, the function calls performed are isomorphic (i.e., the same parameters are passed in the API call and the same data returned by the API) regardless of whether they are called locally on the client or remotely on the server.

FIGS. 10A-B, 10C-D, 11A-B, and 11C-D illustrate several examples of an application dynamically determining whether to execute functions of some embodiments locally (on a client device) or remotely (on a server), and the subsequent execution of those functions. Specifically, FIG. 10 illustrates examples of a function called by a browser-based application (locally in FIGS. 10A-B and remotely in FIGS. 10C-D), while FIG. 11 illustrates examples of a function called by a natively-operating application (remotely in FIGS. 11A-B and locally in FIGS. 11C-D)

As mentioned, FIGS. 10A-10B illustrate the local execution of an API call by a browser-based application. The figures display a user interface of an application in two stages, along with modular diagrams of relevant portions of the software architecture implemented on the client device (e.g., the client device 800 of FIG. 8) during those stages showing the data exchanged by the modules. FIG. 10A includes a simplified graphical user interface (GUI) 1000 of a service and retail rating web site, a user interface module 1002, JSON/JavaScript (JS) storage 1004, application layer 1010, condition detector 1011, and data sets 1012-1016. FIG. 10B includes the GUI 1000 of the service and retail rating web site, the user interface module 1002, data sets 1022-1026 and local cached search storage 1027.

In FIG. 10A, a user enters a search for restaurants in San Mateo, Calif. into the user Interface 1000. In response to the entered search, the user interface module 1002 provides the input 1012 of the search (e.g., the type of establishment being searched for and the geographical location for the search) to the application layer 1010. In some embodiments, the application layer 1010 implements an application (or applications) based on JavaScript and JSON files in the JSON/JS storage 1004. In some embodiments, the application layer 1010 is a JavaScript runtime processor that parses JavaScript and JSON code in these files in order to implement the application functions defined by these files (e.g., by linking the functions in the JavaScript files to the object descriptions in the JSON files). In some embodiments, the JSON and/or JS files include code that identifies conditions under which a function should be implemented remotely (e.g., on a server) or locally (e.g., on a client device).

After receiving the input 1012, the application layer 1010 sends a set of conditions 1014 for the condition detector 1011 to test. In some embodiments, this is implemented as a function call (e.g., implemented as a hook in the JavaScript/JSON model) that calls a condition detector/determination function and passes the set of conditions as parameters. In this example, the conditions 1014 specify that the client device (e.g., the application layer 1010 of the client device) should call the function on the server when there is a connection available between the client device and the server and cached search results (if any) for that search are more than a week old. In the alternative case, when there is no connection available between the client device and the server or when the cached search results for that search exist and are less than a week old, the application layer 1010 will invoke the function on the client device.

In some embodiments, the set of conditions 1014 is specified in the JSON/JS files (from JSON/JS storage 1004) used to implement the application. In other embodiments, the application layer 1010 modifies the conditions specified by these files under some circumstances. For example, in some embodiments, a setting of the device may automatically add a condition (e.g., a condition specifying that functions should always be executed locally when the client device is using a cellular network for data, but may be executed remotely when the client device is using a wireless LAN). The condition detector 1011 determines whether the conditions have been met and sends a condition decision 1016 to the application layer. In FIG. 10A, the decision is to invoke the function locally, because there is no connection available between the client device and the server. In some embodiments, the condition detector actually just returns a determination as to whether the conditions specified in the hook are met, rather than whether to perform the function call locally (using the proxy object) or remotely (using the object on the API server). The decision as to where the function should be performed is specified in the JavaScript/JSON model based on the results of the condition determination.

Accordingly, in FIG. 10B, the application layer 1010 sends a search inquiry 1022 to the local cached search storage 1027 (i.e., performs the specified API call using the local proxy object that calls the local cached data storage), which returns a list of restaurant data 1024 to the application layer 1010 in response to the request. In this case, the API call is a read request (i.e., as opposed to modifying the data in the local cached data storage). The application layer 1010 sends output data 1026 to the user interface module 1002, which displays the output in GUI 1000. In some embodiments the output 1026 is the same as the restaurant data 1024, while in other embodiments, the output data 1026 is based on the restaurant data 1024 with modification (e.g., for formatting, combination with other data received from other API requests, etc.).

FIG. 10C-10D illustrate the remote execution on a server of an API call by the browser-based application operating on the client device. The figures display a user interface of an application in two stages, along with modular diagrams of relevant portions of the software architecture implemented on the client device during those stages showing the data exchanged by the modules. FIG. 10C includes the simplified GUI 1000 of the service and retail rating web site, the user interface module 1002, and data sets 1012-1014 and 1030. FIG. 10D includes the GUI 1000 of the service and retail rating web site, the user interface module 1002, data sets 1032-1036, and a server 1050.

In FIG. 10C, as in FIG. 10A, a user enters a search for restaurants in San Mateo, Calif. into the user interface 1000. In response to the entered search, the user interface module 1002 provides the input 1012 of the search (e.g., the type of establishment being search for and the geographical location for the search) to the application layer 1010, as described above.

After receiving the input 1012, the application layer 1010 sends a set of conditions 1014 for the condition detector 1011 to test. In some embodiments, this is implemented as a function call (e.g., implemented as a hook in the JavaScript/JSON model) that calls a condition detector/determination function and passes the set of conditions as parameters. In this example, as in FIG. 10A, the conditions 1014 specify that the client device (e.g., the application layer 1010 of the client device) should call the function on the server when there is a connection available between the client device and the server and cached search results (if any) for that search are more than a week old. In the alternative case, when there is no connection available between the client device and the server or when the cached search results for that search are less than a week old, the application layer 1010 will invoke the function on the client device.

As described by reference to FIG. 10A, the condition detector 1011 determines whether the conditions have been met and sends a condition decision 1030 to the application layer. In this case, the decision is to call the function remotely using a master object on the API server, because a connection is available to the server and the cached data on the client is over one week old (or there is no data cached on the client). In some embodiments, the condition detector actually just returns a determination as to whether the conditions specified in the hook are met, rather than whether to perform the function call locally (using the proxy object) or remotely (using the master object on the API server). The decision as to where the function should be performed is specified in the JavaScript/JSON model based on the results of the condition determination.

Accordingly, in FIG. 10D, the application layer 1010 sends a search inquiry 1032 to the server 1050 through the server interface 1048. The server 1050 is a remote server for the service and retail rating website shown in GUI 1000. As described above, some embodiments call a REST API on the server using HTTP, and a master object implemented on the server executes the API call (a read operation having the same format and parameters as the locally-executed call from FIG. 10B). The server 1050 then returns a list of restaurant data 1034 to the application layer 1010 on the client by sending data across the network to the server interface 1048 (i.e., a response to the API request, which uses the master object on the server to access more up-to-date data than that on the client). The application layer 1010 sends output data 1036 to the user interface module 1002, which displays the output in GUI 1000. In some embodiments, the output 1036 is the same as the restaurant data 1034, while in other embodiments, the output data 1036 is based on the restaurant data 1034 with modification (e.g., for formatting, combination with other data received from other API requests, etc.).

As noted above, FIG. 11 illustrates examples of a function called by a natively-operating (i.e., non-browser-based) application. FIGS. 11A-11B illustrate the remote execution on a server of an API call by the natively-operating application on the client device. The figures display a user interface of an application in two stages, along with modular diagrams of relevant portions of the software architecture implemented on the client device (e.g., the client device 800 of FIG. 8) during those stages showing the data exchanged by the modules. FIG. 11A includes a simplified GUI 1100 of a banking application, a user interface module 1102, proxy objects storage 1104, application layer 1110, condition detector 1111, and data sets 1112-1116. FIG. 11B includes the GUI 1100 of the banking application, the user interface module 1102, data sets 1122-1126, and server 1150.

In FIG. 11A, a user selects a control in the GUI that causes the application to display upcoming bills in the GUI 1100. In response to the selection, the user interface module 1102 provides the input 1112 of the selection to the application layer 1110. In some embodiments, the application layer 1110 implements an application using proxy objects 1104 that are dynamically retrieved from the server 1150 as JavaScript/JSON models and instantiated as native object equivalents (e.g., as Objective C or Java objects). In some embodiments, the application layer 1110 is a module in a different programming language/system (e.g., objective C for mobile devices running the iOS® operating system from Apple Inc.®, Java for mobile devices running the Android™ operating system, etc.). The runtime processors of some embodiments were described above. In some embodiments, the instantiated proxy objects include code that identifies conditions under which a function should be implemented remotely (e.g., on a server) or locally (e.g., on a client device).

After receiving the input, the application layer 1110 sends a set of conditions 1114 for the condition detector 1111 to test. In some embodiments, this is implemented as a function call (e.g., implemented as a hook in the proxy object) that calls a condition detector/determination function and passes the set of conditions as parameters. In this example, the conditions 1114 specify that the client device (e.g., the application layer 1110 of the client device) should call the function on the server when (1) a connection between the client device and server is available and (2) CPU usage of the client device is above a threshold or the required data for the function is not in a local data cache. In the alternative case, when (1) a connection between the client device and server is not available or (2) CPU usage of the client device is below a threshold and the required data for the function is in a local data cache, the application layer 1110 will invoke the function on the client device.

In some embodiments, the set of conditions 1114 is specified by a proxy object 1104 instantiated on the client and based on a pair of JavaScript/JSON files on the server. In other embodiments, the application layer modifies the conditions specified by these files under some circumstances. For example, in some embodiments, a setting of the device may automatically add a condition (e.g., a condition specifying that functions should always be executed locally when the client device is using a cellular network for data, but may be executed remotely when the client device is using a wireless LAN). The condition detector 1111 determines whether the conditions have been met and sends a condition decision 1116 to the application layer. In FIG. 11A, the decision is to invoke the function remotely (on the server), because (1) a connection between the client device and server is available and (2) CPU usage of the client device is above a threshold. In some embodiments, the condition detector actually just returns a determination as to whether the conditions specified in the hook are met, rather than whether to perform the function call locally (using the proxy object) or remotely (using the object on the API server).

Accordingly, in FIG. 11B, the application layer 1110 sends a bill inquiry 1122 to the server 1150 through server interface 1148. The server 1150 is a remote server for the banking application shown in GUI 1100. As described above, some embodiments call a REST API on the server using HTTP, and a master object implemented on the server executes the API call (a read operation having the same format and parameters as a locally-executed call would). The server 1150 then returns a set of bill data 1124 to the application layer 1110 on the client by sending data across the network to the server interface 1148 (i.e., a response to the API request, which uses the master object on the server to access data stored on the banking application server). The application layer 1110 sends output data 1126 to the user interface module 1102, which displays the output in GUI 1100. In some embodiments the output 1126 is the same as the bill data 1124, while in other embodiments, the output data 1126 is based on the bill data 1124 with modification (e.g., for formatting, combination with other data received from other API requests, etc.).

FIG. 11C-11D illustrate the local execution of the API call by the natively-operating banking application. The figures display a user interface of an application in two stages, modular diagrams of relevant parts of the client device of FIG. 8 during those stages, and the data exchanged by the modules in those stages. FIG. 11C includes the graphical user interface (GUI) 1100 of the banking application, the user interface module 1102, and data sets 1112-1114 and 1130. FIG. 11D includes the GUI 1100 of the banking application, the user interface module 1102, data sets 1132-1136, and local cached banking data storage 1127.

In FIG. 11C, as in FIG. 11A, a user selects a control to display upcoming bills in GUI 1100. In response to the selection, the user interface module 1102 provides the input 1112 of the selection to the application layer 1110, as described above.

After receiving the input 1112, the application layer 1110 sends a set of conditions 1114 for the condition detector 1111 to test. In some embodiments, this is implemented as a function call (e.g., implemented as a hook in the proxy object) that calls a condition detector/determination function and passes the set of conditions as parameters. In this example, the conditions 1114 specify that the client device (e.g., application layer 1110) should call the function on the server when (1) a connection between the client device and server is available and (2) CPU usage of the client device is above a threshold or the required data for the function is not in a local data cache. In the alternative case, when (1) a connection between the client device and server is not available or (2) CPU usage of the client device is below a threshold and the required data for the function is in a local data cache, the application layer 1110 will invoke the function on the client device.

In some embodiments, as noted above, the set of conditions 1114 is specified by a proxy object 1104 instantiated on the client and based on a pair of JavaScript/JSON files on the server. In other embodiments, the application layer modifies the conditions under some circumstances. The condition detector 1111 determines whether the conditions have been met and sends a condition decision 1130 to the application layer. In this case, the decision is to invoke the function locally (on the client device), because the CPU usage on the client device is low and the necessary bills data is stored in cached locally on the client device.

Accordingly, in FIG. 11D, the application layer 1110 sends a bill inquiry 1132 to the local cached banking data storage 1127 (i.e., performs the specified API call using the local proxy object that calls the local cached data storage), which returns a list of bill data 1134 to the application layer in response to the request. In this case, the API call is again a read request that does not modify the data in the local cached storage. The application layer 1110 sends output data 1136 to the user interface module 1102, which displays the output in GUI 1100. In some embodiments, the output 1136 is the same as the bill data 1134, while in other embodiments, the output data 1136 is based on the bill data 1134 with modification (e.g., for formatting, combination with other data received from other API requests, etc.).

Some embodiments of the invention provide a novel method of generating application programming interfaces (APIs) in a codeless manner. The method of some embodiments generates a schema description of a data storage (e.g., a relational database) with which an API-accessible object may have to exchange data (e.g., from which the object may have to read data and/or to which the object may have to write data) to process an API request during the execution of an application. Based on the generated schema description, the method constructs one or more data graphs, with each data graph representing one set of relationships between different sets of fields in the data storage. After generating the data graphs, the method generates a large number of possible API permutations by using the generated data graphs.

After generating the large number of possible API permutations, the method presents the generated sample APIs so that a developer can select and customize one or more APIs while developing an application. Each selected API will allow the application to exchange data with the data storage. Once the developer selects and customizes a presented sample API, the method completes a description of the object for processing the selected API and stores this description as part of the application that is being developed. When the application is being executed, the object is instantiated to process API requests by exchanging data (e.g., reading, writing, posting and/or deleting data) with the data storage in order to formulate a response to the API request.

Some embodiments of the invention provide a JS framework (e.g., like a node.js framework or a node.js like framework) that provides robust and simple tools for specifying class descriptions of objects for processing API requests. In some embodiments, this framework can be used as a server-side framework to define an API server and/or as a framework to define client side applications (e.g., mobile applications). In some embodiments, the framework employs a JavaScript Definition Language (JSDL) that allows a developer to specify JS data models. As mentioned above, a JS data model of some embodiments can be defined in terms of a JS file that specifies the model's behavior and a JSON file that specifies the model's properties. JSDL of some embodiments provides a set of extensions to standard JSON file format that allows a developer to specify a rich set of properties for a JS object that needs to process an API request.

In some embodiments, JSDL allows a developer (e.g., a mobile application developer) to develop an entire set of objects with corresponding APIs by writing the objects entirely in JSON form. Specifically, the framework of some embodiments allows a developer to define a model in a variety of ways, including (1) using a model generator of the framework, (2) a JSON instance introspection capability of the framework, and (3) a database discovery API of the framework.

A simple method of creating a model in some embodiments is through a command line API command that invokes the model generator. When the model generator is invoked, a simple model can be defined by specifying a property definition in a JSON model. Such a property definition can include a set of one or more property key-value pairs, in the form of "propertyName: type element." In this type of definition, the property name is the key and the type of property is the value. An example of a property definition in JSON of some embodiments is as follows:

```
{
    "id": "number",
    "firstName": "string",
    "lastName": "string"
}
```

In this example, the JSON model has three different properties: (1) the property name (i.e., key) "id" which has a property type (i.e., value) of a number, (2) the key "firstName" that has a property value of a string, and (3) the key "lastName" that also has a property value of a string. In other words, each key of some embodiments in the JSON object defines a property in the model and has an associated type. In some embodiments, JSDL provides a number of built-in types, such as string, number, Boolean, array, and object.

Another method of describing the above-described model in some embodiments is by specifying the following JS code:

```
var UserDefinition = {
    id: Number,
    firstName: String,
    lastName: String
}
```

In some embodiments, a new model can also be created by extending a current model. For instance, a developer can extend a model named User to create a new model called Customer. As illustrated in the example below, the model Customer will inherit properties and methods of the model User.

```
var Customer = User.extend('customer',
{
    accountId: String,
    vip: Boolean
});
```

In this example the model Customer has inherited all the properties of the model User and additionally has two more keys that are "accountId" and "vip" with two values string and Boolean respectively.

Some embodiments allow a developer to define a model by mixing its definition with the definition of one or more other models, as illustrated in the following example:

```
var TimeStamp = modelBuilder.define('TimeStamp', {created: Date, modified: Date});
var Group = modelBuilder.define('Group', {groups: [String]});
User.mixin(Group, TimeStamp);
```

In this example, the User model is a mix of the Group and TimeStamp models.

To create a model, the model generator of some embodiments allows a developer to add properties, control logic rules, relationships, and data sources to the model, and to expose the model to APIs from remote locations (e.g., from client devices and other servers). These operations will be briefly described below. These operations will also be further elaborated below after discussing model creation through database schema discovery and through instance introspection.

The following example illustrates a framework's command line controls for defining a model and adding properties to the model. In this and other examples below, the framework is called loopback. Also, in this example, the model being created is called book. This model represents a book database. To create this model, the developer can enter the following command: $ slc loopback:model book. The developer is then prompted to choose the data source to which the model will connect. By default, the model generator of some embodiments will only list the in-memory data source (named "db" in this example), as follows:
   [?] Select the data-source to attach book to: (Use arrow keys)
      db
As further described below, other data source options will be displayed at this stage when the developer creates additional data sources.

If the developer presses RETURN after being presented with the in-memory data source db, the model will be connected to this data source. Next, the generator will ask:
   [?] Expose book via the REST API? (Y/n),
and the developer will have to enter Y or N to indicate respectively that the created model should or should not be exposed to remote access through REST web services.

Next, the developer can add properties to a model through the command $ slc loopback:property. The invocation of this command will then prompt developer (1) to select from models in the application, to which it will add new property, (2) to enter the name of the property to add, (3) to select the data type of the property, and (4) to specify whether the property is required. The command-line interface during this sequence of operations is as follows in some embodiments:

```
$ slc loopback:property
[?] Select the model: inventory
[?] Enter the property name: price
[?] Property type: (Use arrow keys)
   string
      number
   boolean
   object
   array
   date
   buffer
   geopoint
   (other)
```

After each property is added to the book model, pressing RETURN will accept the default type (which is string in some embodiments) for each property. If another type should be specified, the developer has to choose the desired type. Once the developer is done entering the model properties, the model generator presents a list of properties and their types, and prompts the developer to specify request the construction of this model, as follows:
   Done defining model book (books).
      title (string)
      author (string)
      description (string)
      totalPages (number)
      genre (string)
   Create this model? (yes):
One example of a developer using the model generator to create a new model in an existing application is as follows. This process starts through a command line input:
   $ cd<loopback-app-dir>
   $ slc loopback:model [model-name]

In this example, model-name is the name of the model the developer wishes to create (optional on command line). The model generator will then prompt the developer for model name, if supplied a name on the command-line, the developer is required to just press Enter to use it. By default, only the memory connector data source exists.

The developer, however, can add additional data sources by using the framework's data source generator. This data source generator can be invoked by a command $ slc loopback:datasource [name]. In response, the data source generator will prompt the developer (1) to enter the name of the new data source (when the developer supplied a name on the command-line, the developer can just press Enter to use it), and (2) to select the connector to use for the data source. One example of this invocation is as follows:

```
$ slc loopback:datasource
[?] Enter the data-source name: corp2
[?] Select the connector for corp2: (Use arrow keys)
   other
      In-memory db
   MySQL
   PostgreSQL
   Oracle
   Microsoft SQL
   MongoDB
   SOAP webservices
   REST services
   Neo4j
   Kafka
```

If the created model is exposed over REST, then all the standard create, read, update, and delete (CRUD) operations are available via REST endpoints. The developer, in some embodiments, can also add developer's own custom remote methods that can be called via REST operations.

As mentioned above, some embodiments provide various ways for creating a model. In some embodiments, these various ways depend on the kind of data source on which the model is based. For instance, in addition to the above-described model generator, the framework of some embodiments allows a developer to build (1) a dynamic model for free-form data by using instance introspection of JSON data (e.g., from NoSQL databases or REST APIs), and (2) a static, schema-driven model by using a database discovery API (e.g., for discovering the schema of an RDB).

An example of creating a dynamic model by using instance introspection when the data does not have a schema is as follows:

```
var ds = require('../data-sources/db.js')('memory');
// Instance JSON document
var user = {
   name: 'Joe',
   age: 30,
   birthday: new Date( ),
   vip: true,
   address: {
      street: '1 Main St',
      city: 'San Jose',
      state: 'CA',
      zipcode: '95131',
      country: 'US'
   },
   friends: ['John', 'Mary'],
   emails: [
      {label: 'work', id: 'x@sample.com'},
      {label: 'home', id: 'x@home.com'}
   ],
   tags: [ ]
};
```

```
// Create a model from the user instance
var User = ds.buildModelFromInstance('User', user, {idInjection: true});
// Use the model for CRUD
var obj = new User(user);
console.log(obj.toObject( ));
User.create(user, function (err, u1) {
   console.log('Created: ', u1.toObject( ));
   User.findById(u1.id, function (err, u2) {
      console.log('Found: ', u2.toObject( ));
   });
});
```

Unlike dynamic models, a developer can define static models for models with schema definitions (e.g., RDB). The developer can create static models using framework's discovery API by consuming existing data from a relational database. The developer then can keep the static model synchronized with the database using framework's schema/model synchronization API.

The following example illustrates how a developer can create a model that is associated with an Oracle RDB.

```
var loopback = require('loopback');
var ds = loopback.createDataSource('oracle', {
   "host": "demo.strongloop.com",
   "port": 1521,
   "database": "XE",
   "username": "demo",
   "password": "L00pBack"
});
// Discover and build models from INVENTORY table
ds.discoverAndBuildModels('INVENTORY', {visited: { }, associations: true}, function (err, models) {
   // Now we have a list of models keyed by the model name
   // Find the first record from the inventory
   models.Inventory.findOne({ }, function (err, inv) {
      if(err) {
         console.error(err);
         return;
      }
      console.log("\nInventory: ", inv);
      // Navigate to the product model
      inv.product(function (err, prod) {
         console.log("\nProduct: ", prod);
         console.log("\n ------------ ");
      });
   });
});
```

This example shows that for an Oracle database, a developer can first, write a code that sets up the Oracle data source. The developer can then call to a discoverAndBuildModels( ) function (in the framework's discovery API set) to create models from the database tables. Calling it with the "associations: true" option makes the discovery follow primary/foreign key relations. The codeless creation of APIs by using the RDB schema discovery methodology of some embodiments of the invention is described in detail in U.S. patent application Ser. No. 14/490,651, titled "Codeless Generation of APIs", now issued as U.S. Pat. No. 9,513,941, and which is incorporated herein by reference.

The data source connectors of some embodiments provide discovery capability so that the developer can use DataSource to discover model definitions from existing database schema. The following exemplary APIs enable UI or code to discover database schema definitions that can be used to build models in some embodiments.

```
// List database tables and/or views
ds.discoverModelDefinitions({views: true, limit: 20}, cb);
// List database columns for a given table/view
ds.discoverModelProperties('PRODUCT', cb);
ds.discoverModelProperties('INVENTORY_VIEW', {owner: 'STRONGLOOP'}, cb);
// List primary keys for a given table
ds.discoverPrimaryKeys('INVENTORY', cb);
// List foreign keys for a given table
ds.discoverForeignKeys('INVENTORY', cb);
// List foreign keys that reference the primary key of the given table
ds.discoverExportedForeignKeys('PRODUCT', cb);
// Create a model definition by discovering the given table
ds.discoverSchema(table, {owner: 'STRONGLOOP'}, cb);
```

In addition to discoverAndBuildModels which discovers and builds models from the specified owner/modelName, the other functions for discovering other properties or elements of a data source include: (1) discoverModelDefinitions( ) to discover model definitions (table or collection names), based on tables or collections in a data source; (2) discoverModelProperties( ) to discover metadata on columns (properties) of a DB table; (3) discoverPrimaryKeys ( ) to discover primary key definitions in a database; (4) discoverForeignKeys( ) to discover foreign key definitions from a database; (5) discoverExportedForeignKeys( ) to discover foreign key definitions that are exported from a database; and (6) discoverSchema( ) to discover JSDL models from a database.

As mentioned before, a developer can make a model extend or "inherit from" an existing model that is either one of the built-in models (such as User), or a custom model that the developer has defined in his/her application. For instance, to extend a model with JSON, a developer can first use the model generator to create a new model in the application. In some embodiments, this will create a JSON file in the /common/models directory (e.g., for a customer model, customer.json). The developer can edit this file and set the "base" property in the JSON file to the name of the model the developer wishes to extend, which is either one of the built-in models, or one of the custom models that the developer defined in the application. For example, here is an excerpt from the customer.json file that extends the built-in User model to define a new Customer model: customer.json

```
{
   "name": "Customer",
   "base": "User",
   "idInjection": false,
   ...
```

A developer can also create custom models that extend from a single base custom model. For example, to define a model called MyModel that extends from a custom model that the developer has previously defined and called MyBaseModel, the developer can first create MyModel using slc loopback:model. The developer can then edit the JSON file common/models/MyModel.json as follows:

```
{
   "name": "MyModel",
   "base": "MyBaseModel",
}
```

The developer can also add new properties to the JSON file after the developer has extended the model, for example:

```
{
  "name": "Customer",
  "base": "User",
  "properties": {
    "favoriteMovie": {
      "type": "string"
    }
  }
}
```

To extend a model programmatically, the developer, in some embodiments, can create a JS file with exactly the same base name as the model JSON file. As described before, JS and JSON files that are commonly named are associated together to define a model in some embodiments. For example, if the customer model is defined in customer.json, then the developer can create customer.js. Both of these files must be in the /common/models directory. After creating the JSON file, the developer can extend a model programmatically with the extend( ) method. The method's signature is: newModel=modeName.extend('modelName', properties [, settings]), where:

- newModel is the name of the new model the developer is defining.
- modelName is the name of the model the developer is extending.
- properties is a JSON object defining the properties to add to the model.
- settings is an optional JSON object defining other options such as relations, ACLs, and so on.

To attach a model to a data source, some embodiments of the invention use data source abstractors and connectors. As mentioned above, a data source abstractor enables a model to access and modify data in backend systems. The abstractor encapsulates business logic to exchange data between models and various backend systems (such as relational databases, REST APIs. SOAP web services, storage services, etc.). Data source abstractors generally provide create, retrieve, update, and delete (CRUD) functions in some embodiments.

In some embodiments, models access data sources not only through the abstractors but also through data source connectors, which are extensible and customizable. In general, application code does not use a connector directly. Rather, the data source abstractor provides an API to configure the underlying connector. By default, slc (i.e., the command line API) creates and uses the memory connector, which is suitable for development. To use a different data source, the developer can use slc loopaback:datasource to create the new data source and add it to the application's datasources.json. The developer then can edit datasources.json to add the appropriate credentials for the data source. Next, the developer can create a model to connect to the data source or modify an existing model definition to use the connector.

For example, to add a new data source, in some embodiments, the developer can use the data source generator: $ slc loopback:datasource. The system will prompt the developer for the name of the new data source and the connector to use; for example, MySQL, Oracle, REST, and so on. The tool will then add an entry such as the following to datasources.json:

```
...
"corp1": {
  "name": "corp1",
  "connector": "mysql"
}
...
```

The above example creates a MySQL data source called "corp1". The identifier determines the name by which the developer refers to the data source and can be any string. Now the developer can add data source credentials. For example, the developer can edit datasources.json to add the necessary authentication credentials for the data source, which is typically the hostname, username, password, and database name. For example:

```
"corp1": {
  "name": "corp1",
  "connector": "mysql",
  "host": "the userr-mysql-server.foo.com",
  "user": "db-username",
  "password": "db-password",
  "database": "the userr-db-name"
}
```

To make the model use the data source, the developer can edit the JSON file to set the data source used by a model:

```
"model-name": {
  "properties" : {
    ...
  }
  "dataSource": "datasource-name",
  ...
}
```

For example, using the previous example where the data source was named "mysql," the developer can edit the "books" data source, to change the "dataSource" property from "db" to "corp1" to use the corresponding MySQL database:

```
"book": {
  "properties": {
    ...
  },
  "public": true,
  "dataSource": "corp1",
  "plural": "books"
}
```

Then the books model would use the "corp1" data source that uses the MySQL connector instead of the "db" data source that uses the memory connector.

In some embodiments the following connectors are available for a developer:

| Connector | Module | Installation |
| --- | --- | --- |
| Memory connector | Built in to LoopBack | Not required |
| Email | Built in to LoopBack | Not required |
| MongoDB | loopback-connector-mongodb | npm install -- save loopback-connector-mongodb |
| MySQL | loopback-connector-mysql | npm install -- save loopback-connector-mysql |

-continued

| Connector | Module | Installation |
|---|---|---|
| Oracle | loopback-connector-oracle | npm install -- save loopback-connector-oracle |
| PostgreSQL | loopback-connector-postgresql | npm install -- save loopback-connector-postgresql |
| REST | loopback-connector-rest | npm install -- save loopback-connector-rest |
| SOAP | loopback-connector-soap | npm install -- save loopback-connector-soap |
| SQL Server | loopback-connector-mssql | npm install -- save loopback-connector-mssql |

To install a connector, the developer can run JS package install and then save, for the connector module to add the dependency to package.json; for example:

```
...
"dependencies": {
  "loopback-connector-oracle": "latest"
}
...
```

In order to create a data source in some embodiments, the developer can use the data source generator to create a new data source or create a data source programmatically. The data source properties of some embodiments depend on the specific data source being used. However, data sources for database connectors (e.g., Oracle, MySQL, PostgreSQL, MongoDB, etc.) in some embodiments share a common set of properties, as described in the following table:

| Property | Type | Description |
|---|---|---|
| connector | String | Connector name; one of:<br>"memory"<br>"loopback-connector-mongodb" or "mongodb"<br>"loopback-connector-mysql" or "mysql"<br>"loopback-connector-oracle" or "oracle"<br>"loopback-connector-postgresql" or "postgresql"<br>"loopback-connector-rest" or "rest"<br>"loopback-connector-mssql" or "mssql" |
| database | String | Database name |
| debug | Boolean | If true, turn on verbose mode to debug database queries and lifecycle. |
| host | String | Database host name |
| password | String | Password to connect to database |
| port | Number | Database TCP port |
| username | String | Username to connect to database |

As discussed before, some embodiments expose models over a REST API. In some embodiments, the framework automatically binds a model to a list of HTTP endpoints that provide REST APIs for model instance data manipulations (e.g., through CRUD operations) and other remote operations. By default, the REST APIs are mounted to the plural of the model name. For example, if the developer has a location model, it is mounted to /locations. By default, scaffolded applications expose models over REST using the loopback.rest router:

```
var app = loopback( );
app.use(loopback.rest( ));
// Expose the 'Product' model
app.model(Product);
```

After running the above codes, the developer will have the Product model with create, read, update, and delete (CRUD) functions working remotely from mobile clients. At this point, the model is schema-less and the data are not checked. The developer can then view generated REST documentation at a particular link (e.g., http://localhost:3000/explorer). In some embodiments, the framework provides a number of built-in models that have REST APIs. By default, for a model backed by a data source that supports it, the framework exposes a REST API that provides all the standard create, read, update, and delete (CRUD) operations.

As an example, consider a simple model called Location (that provides business locations), the framework automatically creates the following endpoints to illustrate the exposed REST APIs:

| Model API | HTTP Method | Example Path |
|---|---|---|
| create( ) | POST | /locations |
| upsert( ) | PUT | /locations |
| exists( ) | GET | /locations/:id/exists |
| findById( ) | GET | /locations/:id |
| find( ) | GET | /locations |
| findOne( ) | GET | /locations/findOne |
| deleteById( ) | DELETE | /locations/:id |
| count( ) | GET | /locations/count |
| prototype.updateAttributes( ) | PUT | /locations/:id |

The above API follows the standard model REST API that most built-in models extend. To expose a model over REST, the developer must set the public property to true in /server/model-config.json:

```
...
"Role": {
  "dataSource": "db",
  "public": false
},
...
```

If the developer does not wish to expose certain CRUD operations, the developer can easily hide them by setting the model's shared property to false. For example, following the previous example, by convention custom model code would go in the file server/location.js. The developer would add the following lines to "hide" one of the predefined remote methods:
 var isStatic=true;
 MyModel.sharedClass.find('deleteById', isStatic).shared=false;

After adding these lines, the deleteById( ) operation and the corresponding REST endpoint will not be publicly available. In addition to the standard set of REST API endpoints that a model exposes, the developer can expose a model's static methods to clients over REST. These static methods are called, in some embodiments, remote methods. Additionally, the developer can define remote hooks that are functions called when a remote method is executed (typically, before or after the remote method).

In defining a remote method of some embodiments, the remote method must accept a callback with the conventional fn(err, result, . . . ) signature. A developer can expose a remote method in a model's custom script /common/models/modelName.js file by (1) exporting a function that takes the model as an argument (e.g., module.exports=function(modelName)), (2) in this function, defining the function as a static method of the model (e.g., modelName.functionName=function(args)), and (3) also in the function, calling remoteMethod( ) as described below to expose the function as a remote method. The first argument to remoteMethod( ) must be a string that exactly matches the static method defined in the second step.

A complete example of exposing a remote model, using a Person model, is illustrated below. The developer would add the following code in /common/models/person.js:

```
module.exports = function(Person){
    Person.greet = function(msg, cb) {
        cb(null, 'Greetings... ' + msg);
    }
    Person.remoteMethod(
        'greet',
        {
            accepts: [{arg: 'msg', type: 'string'}],
            returns: {arg: 'greeting', type: 'string'}
        }
    );
}
```

Running the above code in a local application and sending a POST request with the argument "LoopBack Developer" to the default URL http://localhost:3000/api/people/greet will then return:

```
{
    "greeting": "Greetings... LoopBack Developer"
}
```

As summarized above, to expose a function as a remote method on a model, a developer may call the model's remote.Method( ) function. The function's signature, in some embodiments, is modelName.remoteMethod(function, [options]), where (i) modelName is the name of the model, (ii) function is the remote method being defined, and (iii) options is the optional JSON object with metadata about the function as described in the following table:

| Option | Required? | Description |
| --- | --- | --- |
| accepts | No | Describes the remote method's arguments. The callback argument is assumed; do not specify. |
| returns | No | Describes the remote method's callback arguments. The err argument is assumed; do not specify. |
| http.path | No | HTTP path (relative to the model) at which the method is exposed. |
| http.verb | No | HTTP method (verb) at which the method is available. One of: get post (default) put del all |
| description | No | A text description of the method. This is used by API documentation generators like Swagger. |

The "accepts" and "returns" properties in the above table define either a single argument as an object or an ordered set of arguments as an array. Each individual argument has properties for:

| Property (key) | Type | Description |
| --- | --- | --- |
| arg | String | Argument name |
| type | String | Argument datatype; must be an accepted type. |
| required | Boolean | True if argument is required; false otherwise. |
| root | Boolean | For callback arguments: set this property to true if the user function has a single callback argument to use as the root object returned to remote caller. Otherwise the root object returned is a map (argument-name to argument-value). |
| http | String | For input arguments: a function or an object describing mapping from HTTP request to the argument value. |

An example of a single argument, specified as an object can be shown as: {arg: 'myArg', type: 'number'}, while an example of multiple arguments, specified as an array can be shown as:

```
[
    {arg: 'arg1', type: 'number', required: true},
    {arg: 'arg2', type: 'array'}
]
```

In some embodiments, there are two ways to specify HTTP mapping for input parameters (i.e., what the method accepts): (1) provide an object with a source property, and (2) specify a custom mapping function. To provide an object with a source property to specify HTTP mapping for input parameters, a developer can provide an object with a source property that has one of the values shown in the following table:

| Value of source property | Description |
| --- | --- |
| body | The whole request body is used as the value. |
| form | The value is looked up using req.param, which searches route arguments, the request body and the query string. |
| query | |
| path | Note that query and path are aliases for form. |
| req | The whole HTTP request object is used as the value. |

For example, an argument can get the whole request body as the value: {arg: 'data', type: 'object', http: {source: 'body'}}. As described above, to specify HTTP mapping for input parameters, a developer can also specify a custom mapping function. For example, the developer can specify:

```
{
    arg: 'custom',
    type: 'number',
    http: function(ctx) {
        // ctx is LoopBack Context object
        // 1. Get the HTTP request object as provided by Express
        var req = ctx.req;
        // 2. Get 'a' and 'b' from query string or form data
        // and return their sum as the value
        return +req.param('a') + req.param('b');
    }
}
```

On the other hand, if the developer does not specify a mapping, the framework will determine the value by determining whether the HTTP request parameter args with a JSON content exists (assuming name as the name of the input parameter to resolve). If there is a HTTP request parameter args with a JSON content, then the value of args['name'] is used as the value if it is defined. Otherwise, req.param('name') is returned as the value.

As mentioned above, a remote hook enables the developer to execute a function before or after a remote method is called by a client. The beforeRemote( ) function runs before the remote method and afterRemote( ) function runs after the remote method. For example:

```
var request = require('request');
Users.afterRemote('count', function(ctx, unused, next)
{
  request.post({
    url: 'http://another.server.com/',
    method: 'POST',
    json: ctx.result
  }, function(err, response) {
    if (err) console.error(err);
    next( );
  });
});
```

Below is another example that uses wildcards in the remote function name:

```
User.beforeRemote('*.save', function(ctx, user, next) {
  if(ctx.req.accessToken) {
    next( );
  } else {
    next(new Error('must be logged in to update'))
  }
});
User.afterRemote('*.save', function(ctx, user, next) {
  console.log('user has been saved', user);
  next( );
});
```

The second argument to the hook (user in the above example) is the ctx.result, which is not always available. More examples of remote hooks with wildcards to run a function before any remote method is called, are given below:

```
// ** will match both prototype.* and *.*
User.beforeRemote('**', function(ctx, user, next) {
  console.log(ctx.methodString, 'was invoked remotely'); //
  users.prototype.save was invoked remotely
  next( );
});
Other wildcard examples
// run before any static method eg. User.find
User.beforeRemote('*', ...);
// run before any instance method eg. User.prototype.save
User.beforeRemote('prototype.*', ...);
// prevent password hashes from being sent to clients
User.afterRemote('**', function (ctx, user, next) {
  if(ctx.result) {
    if(Array.isArray(ctx.result)) {
      ctx.result.forEach(function (result) {
        result.password = undefined;
      });
    } else {
      ctx.result.password = undefined;
    }
  }
  next( );
});
```

In some embodiment, remote hooks are provided with a Context ctx object that contains transport-specific data (for HTTP: req and res). The ctx object also has a set of consistent APIs across transports. In some embodiments, applications that use loopback.rest( ) middleware, provide additional ctx properties such as ctx.req for expressing Request object; ctx.res for expressing Response object; ctx.req.accessToken for accessing token of the user calling the remote method (ctx.req.accessToken is undefined if the remote method is not invoked by a logged in user (or other principal)); and ctx.result (during afterRemote hooks) which will contain the data that is about to be sent to a client (a user can modify this object to transform data before it is sent). In addition to the hooks mentioned above, the user of some embodiments can define the following other hooks:
  afterInitialize,
  beforeValidate/afterValidate,
  beforeSave/afterSave,
  beforeCreate/afterCreate,
  beforeUpdate/afterUpdate, and
  beforeDestroy/afterDestroy.

As described before, a schema defines a static model that is backed by a database. A model can validate data before passing it on to a data store (such as a database) to ensure that it conforms to the backend schema. For example, the following code defines a schema and assigns it to the product model. The schema defines two fields (columns): name, a string, and price, a number. The field name is a required value.

```
var productSchema = {
  "name": { "type": "string", "required": true },
  "price": "number"
};
var Product = Model.extend('product', productSchema);
```

A schema imposes restrictions on the model. If a remote client tries to save a product with extra properties (e.g., description), those properties are removed before the application saves the data in the model. Also, since name is a required value, the model will only be saved if the product contains a value for the name property. Rather than modifying the error responses returned by the server, the developer of some embodiments can localize the error message on the client. The validation error response contains error codes in error.details.codes, which enables clients to map errors to localized messages. Below is an example error response:

```
{
  "name": "ValidationError",
  "status": 422,
  "message": "The Model instance is not valid. \
  See `details` property of the error object for more info.",
  "statusCode": 422,
  "details": {
    "context": "user",
    "codes": {
      "password": [
        "presence"
      ],
      "email": [
        "uniqueness"
      ]
    },
    "messages": {
      "password": [
        "can't be blank"
      ],
      "email": [
        "Email already exists"
      ]
    }
  }
}
```

As stated before, most applications need to implement authentication and authorization on the users who access the data (i.e., control who (or what) can access data). Typically, this involves requiring users to login to access protected data, or requiring authorization tokens for other applications to access protected data.

Applications of some embodiments access data through models, hence controlling access to data means putting restrictions on models. That is, specifying who or what can read, write, or change the data in the models. In some embodiments, the general process to implement access control for an application is first to define the user roles that the application requires. For example, the developer might create roles for anonymous users, authorized users, and administrators.

Next, the developer can define access for each role and model method. For example, the developer might enable anonymous users to read a list of banks, but not allow them to do anything else. In some embodiments, the models have a set of built-in methods, and each method maps to either the READ or WRITE access type. In essence, this step amounts to specifying whether access is allowed for each role and each model in addition to the access type. Lastly, the developer implements the authentication, i.e., in the application, by adding code to create (register) new users, login users (get and use authentication tokens), and logout users.

In order to control data access, the application developer specifies the application's users' roles. The first step in specifying user roles is to determine what roles the application needs. Most applications will have un-authenticated or anonymous users (those who have not logged in) and authenticated users (those who have logged in). Additionally, many applications will have an administrative role that provides broad access rights. Applications of some embodiments can have any number of additional user roles as appropriate.

The next step is specifying the user access types. The framework in some embodiments provides a built-in User model with a corresponding REST API that inherits all the "CRUD" (create, read, update, and delete) methods of the data access object. Each data access method on the User model maps to either the "READ" or "WRITE" access type, as follows:

READ:
  exists—Boolean method that determines whether a user exists
  findById—Find a user by ID
  find—Find all users that match specified conditions.
  findOne—Finds a single user instance that matches specified conditions.
  count—Returns the number of users that match the specified conditions.
WRITE:
  create—create a new user
  upsert (equivalent to updateOrCreate)—update or insert a new user record.
  deleteById (equivalent to removeById or destroyById)—delete the user with the specified ID.

For other methods, the default access type of some embodiments is "EXECUTE". For example, a custom method maps to the "EXECUTE" access type. The table below is an example of the access control specification for an access control application of some embodiments. It specifies "ALLOW" or "DENY" for any combination of role and access types (READ or WRITE for a specific model).

| Model and access type | Anonymous user role | Authenticated user role | Teller (admin) role |
|---|---|---|---|
| READ Bank | ALLOW | ALLOW | ALLOW |
| WRITE Bank | DENY | DENY | ALLOW |
| READ Account | DENY | ALLOW | ALLOW |
| WRITE Account | DENY | DENY | ALLOW |
| READ Transaction | DENY | ALLOW | ALLOW |
| WRITE Transaction | DENY | DENY | DENY |

Some embodiments use the Yeoman ACL generator to define access controls as the simplest way to define access control for an application. This enables the developer to create a static definition for the application before runtime. The Yeoman generator prompts the developer for all the necessary information as explained below. In some embodiments, the basic process for an application to create and authenticate users is first to register a new user with the User.create( ) method, inherited from the generic model object. The next step is to call User.login( ) to request an access token from the client application on behalf of the user. The developer can create his own access tokens to customize authentication. User.login( ) is a good example of doing that. The developer needs to do verification on the server though to prevent someone from creating tokens even though they don't belong to them. The last step is then to invoke an API using the access token. The developer can provide the access token in the HTTP header or as a query parameter to the REST API call.

In order to create users, an application developer can create (register) a new user with the User.create method as follows (on a client side with calling a REST API and on the server side writing in JS):

```
REST
curl -X POST -H "Content-Type:application/json" \
-d '{"email": "me@domain.com", "password": "secret"}' \
http://localhost:3000/api/users
Node.js
User.create({
  email: 'me@domain.com',    // required by default
  password: 'secret'         // required by default
}, function (err, user) {
  console.log(user.id);      // => the user id (default type: db specific | number)
  console.log(user.email);   // => the user's email
});
```

Typically, the developer might want to add methods to use as a part of the registration process to determine whether a given username is available or if an email address is already registered. One way to do this is to add these methods as beforeRemote hooks on the User object. The developer then can authenticate a user by calling the User.login( ) method and providing a credentials object. By default, each user must provide a password and either a username or email. The developer may also specify how long the access token should be valid by providing a ttl (time to live) in a temporal scale (e.g., in seconds). The following example illustrates this on a client side with calling a REST API and on the server side in JS:

```
REST
curl -X POST -H "Content-Type:application/json" \
-d '{"email": "me@domain.com", "password": "secret", "ttl": 1209600000}' \
http://localhost:3000/api/users/login
This example returns:
{
    "id":
"GOkZRwgZ61q0XXVxvxlB8TS1D6lrG7Vb9V8YwRDfy3YGAN7TM7EnxWHqdbIZfheZ",
    "ttl": 1209600,
    "created": "2013-12-20T21:10:20.377Z",
    "userId": 1
}
The id property in this example is the user's access token.
Node.js
var TWO_WEEKS = 1000 * 60 * 60 * 24 * 7 * 2;
User.login({
    email: 'me@domain.com',      // must provide email or "username"
    password: 'secret',           // required by default
    ttl: TWO_WEEKS                // keep the AccessToken alive for at least two weeks
}, function (err, accessToken) {
    console.log(accessToken.id);       // => GOkZRwg... the access token
    console.log(accessToken.ttl);      // => 1209600 time to live
    console.log(accessToken.created);  // => 2013-12-20T21:10:20.377Z
    console.log(accessToken.userId);   // => 1
});
```

If a login attempt is successful, a new AccessToken is created that points to the user. This token is required when making subsequent REST requests for the access control system to validate that the user can invoke methods on a given Model.

```
REST
ACCESS_TOKEN=6Nb2ti5QEXIoDBS5FQGWIz4poRFiBCMMYJbYXSGHWuulOuy0GTEuGx2-
VCEVvbpBK
# Authorization Header
curl -X GET -H "Authorization: $ACCESS_TOKEN" \
http://localhost:3000/api/widgets
# Query Parameter
curl -X GET http://localhost:3000/api/widgets?access_token=$ACCESS_TOKEN
```

A user will be effectively logged out by deleting the access token they were issued at login. This affects only the specified access token; other tokens attached to the user will still be valid. To destroy access tokens over REST API, the following /logout endpoint can be used:

```
REST
ACCESS_
TOKEN=6Nb2ti5QEXIoDBS5FQGWIz4poRFiBCMMYJbYXSGHWuulOuy0GTEuGx-
2VCEVvbpBK
VERB=POST # any verb is allowed
# Authorization Header
curl -X VERB -H "Authorization: $ACCESS_TOKEN" \
http://localhost:3000/api/users/logout
# Query Parameter
curl -X VERB http://localhost:3000/api/users/logout?access_token=$ACCESS_TOKEN
Node.js
var USER_ID = 1;
var ACCESS_TOKEN =
'6Nb2ti5QEXIoDBS5FQGWIz4poRFiBCMMYJbYXSGHWuulOuy0GT-
EuGx2VCEVvbpBK';
// remove just the token
var token = new AccessToken({id: ACCESS_TOKEN});
token.destroy( );
// remove all user tokens
AccessToken.destroyAll({
    where: {userId: USER_ID}
});
```

As described before, in order to control data access, the first step is to specify the application users' roles. The framework of some embodiments enables the developer to define both static and dynamic roles. Static roles are stored in a data source and are mapped to users. In contrast, dynamic roles are not assigned to users and are determined during access. Below is an example of defining a new static role and assigning a user to that role:

```
// Create a new user
User.create({name: 'John', email: 'x@y.com', password: 'foobar'},
function (err, user) {
// Create the static admin Role
Role.create({name: 'admin'}, function (err, role) {
  // Make John an admin
    role.principals.create({principalType: RoleMapping.USER, principalId:
    user.id});
  });
});
```

After defining the new static role, the developer can use the role in the access controls. For example, the developer can add the following lines to the file models.json to enable users in the "admin" role to call all REST APIs:

```
{
  "accessType": "*",
  "permission": "ALLOW",
  "principalType": "ROLE",
  "principalId": "admin"
}
```

Sometimes static roles of some embodiments are not flexible enough and therefore dynamic roles are needed. Below is an example of defining a user defined dynamic role:

```
Role.registerResolver('$friend', function(role, ctx, callback) {
  var targetUserId = ctx.modelId;
  // Below has a callback signature: callback(err, isFriend)
  MyUser.isFriend(targetUserId, ctx.getUserId( ), callback);
});
```

Using the dynamic role defined above, we can restrict access of user info to users that are friends.

```
{
  "accessType": "READ",
  "permission": "ALLOW",
  "principalType": "ROLE",
  "principalId": "$friend"
}
```

Some embodiments allow to manually enable the access controls. However, in these embodiments, if the application is created with slc loopback, then there is no need to do anything to enable the access control. Otherwise, to add access control manually, the developer must call the Loop-Back enableAuth( ) method. The following example shows how a user can manually add an access control:

var loopback=require('loopback');

var app=loopback( );

app.enableAuth( );

In some applications, the developer may need to make changes to ACL definitions at runtime. There are two different ways to change ACL definitions at runtime: (1) call the data source method createModel( ) and provide an ACL specification (in JSDL) as an argument, and (2) call the ACL.create( ) method. A user can also control access to a model by passing a JSDL specification when creating the model with the data source createModel( ) method:

```
var Customer = loopback.createModel('Customer', {
  name: {
    type: String,
    // Property level ACLs
    acls: [
      {principalType: ACL.USER, principalId: 'u001', accessType:
ACL.WRITE, permission: ACL.DENY},
      {principalType: ACL.USER, principalId: 'u001', accessType:
ACL.ALL, permission: ACL.ALLOW}
    ]
  }
}, {
  // By default, access will be denied if no matching ACL entry is found
  defaultPermission: ACL.DENY,
  // Model level ACLs
  acls: [
    {principalType: ACL.USER, principalId: 'u001', accessType:
ACL.ALL, permission: ACL.ALLOW}
  ]
});
```

ACLs defined as part of the model creation are hard-coded into the application. The framework of some embodiments also allows the user to dynamically define ACLs through code or a dashboard. The ACLs can also be saved to and loaded from a database in some embodiments.

In general, some client applications (e.g., mobile applications) need to be able to operate without constant network connectivity. This means the client application must synchronize data with the server application after a disconnection period. In order to achieve synchronization, (1) the client (browser) application should replicate changes made in the server application, and (2) the server application should replicate the changes made in the client (browser) application. The synchronization (sync) process replicates data from the source to the target, and the target calls a replication API. The replication API of some embodiments is a JavaScript API, and thus works with a JavaScript client. The replication API of other embodiments can be other non-JS APIs that can run on non-JS clients.

Replication means intelligently copying data from one location to another. The framework copies data that has changed from source to target, but does not overwrite data that was modified on the target since the last replication. So, the sync process of some embodiments is a bi-directional replication. In general, there may be conflicts when performing replication. For example, while disconnected, a user may make changes on the client that conflict with changes made on the server. When an object or field is modified both locally and remotely and there is a risk of generating conflicts, the framework of some embodiments handles the conflict resolution for the users, and enables the developers to easily present a user interface in the application to allow the end user to make informed decisions to resolve conflicts when they occur.

The framework of some embodiments implements synchronization using the browser API that provides the same client JS API as for the server. Thus, the framework in the browser is sometimes referred to as isomorphic, because a user can call exactly the same APIs on the client and server. The framework in the browser of some embodiments uses Browserify to handle dependencies and gulp to generate the client API based on the backend models and REST API.

In addition to basic client-server replication, the framework of some embodiments also supports replicating data (1) from a server application to another server application and (2) from one database to another database. Synchronization as described above to handle offline operation is called offline sync in some embodiments. The framework also provides the ability to consolidate (or "batch") data changes the user makes on the device and send them to the server in a single HTTP request. This type of synchronization is called online sync in some embodiments.

A conflict occurs when a change to a model is not based on the previous revision of the model. The callback of Model.replicate( ) takes err and conflict[ ]. Each conflict represents a change that was not replicated and must be manually resolved. The developer can fetch the current versions of the local and remote models by calling conflict.models( ). The developer can also manually merge the conflict by modifying both models. Calling conflict.resolve ( ) will set the source change's previous revision to the current revision of the (conflicting) target change. Since the changes are no longer conflicting and appear as if the source change was based on the target, they will be replicated normally as part of the next replicate( ) call.

The model object provides a number of methods to support sync, mixed in via the DataModel object. Some of these sync methods are as follows:
1. diff—Get a set of deltas and conflicts since the given checkpoint.
2. changes—Get the changes to a model since a given checkpoint. Provide a filter object to reduce the number of results returned.
3. checkpoint—Create a checkpoint.
4. currentCheckpoint—Get the current checkpoint ID.
5. replicate—Replicate changes since the given checkpoint to the given target model.
6. createUpdates—Create an update list for Model.bulkUpdate( ) from a delta list from Change.diff( ).
7. bulkUpdate—Apply an update list.
8. getChangeModel—Get the Change model.
9. getSourceId—Get the source identifier for this model/dataSource.
10. enableChangeTracking—Start tracking changes made to the model.
11. handleChangeError—Handle a change error. Override this method in a subclassing model to customize change error handling.
12. rectifyChange—Tell the framework that a change to the model with the given ID has occurred.
13. Created—an entry in the change list without a previous revision or if an entry does not exist and the given model does exist
14. Modified—an entry with a current and previous revision
15. Deleted—an entry with only a previous revision or if an entry does not exist and the given model also does not exist In some embodiments, the change list and replication can be used against existing data sources with large sets of data. This is made possible by using the revision semantics described above. The changes made without the framework API, however, will be treated as "created" or "deleted" change list entries. The Changes made to a data source that supports replication will be tracked as revisions in that data source's change list. A data source's change list is stored like any other model data. Each model has its own "Change" model. The "Change" model may be attached to any data source. This allows the user to store the change lists in any data source.

During replication a user may supply a filter in some embodiments. The less data the user tries to replicate, the faster and more memory efficient the replication will be. If the user is manually implementing the replication algorithm, the user should run as many steps in the replication process in parallel as possible. This is usually called the "bulk update" step(s).

As discussed above, the framework in the client machine is sometimes referred to as isomorphic framework, because it provides the exact same API as the server framework. A user can create models and use the memory adapter and have his application fully running in the browser machine. The user can seamlessly connect models using the Remote Connector to connect different devices (e.g., browser to server or server to server). Some embodiments accomplish this by enhancing remoting to be able to accept and return ModelTypes in addition to the JSON and its JSON primitives. Because the models do not need to know where they are being run, the developer can share the same API regardless of where developer's code is running, thus making the API isomorphic. Models are referenced through one way— "local" versus "remote". This is a foundation for how the replication API for data synchronization between browser and server is built in some embodiments.

In the browser, the main application file calls the function exported by the boot module to setup the application by executing the instructions contained in the browser bundle:

```
browser-app.js
var loopback = require('loopback');
var boot = require('loopback-boot');
var app = module.exports = loopback( );
boot(app);
```

The application object created above can be accessed via require('loopback-app'), where loopback-application is the identifier used for the main application file in the Browserify build shown above. Below is a simple example demonstrating this concept:

```
index.html
<script src="app.bundle.js"> </script>
<script>
  var app = require('loopback-app');
  var User = app.models.User;
  User.login({
    email: 'test@example.com',
    password: '12345'
  }, function(err, res) {
    if (err) {
      console.error('Login failed: ', err);
    } else {
      console.log('Logged in.');
    }
  });
</script>
```

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
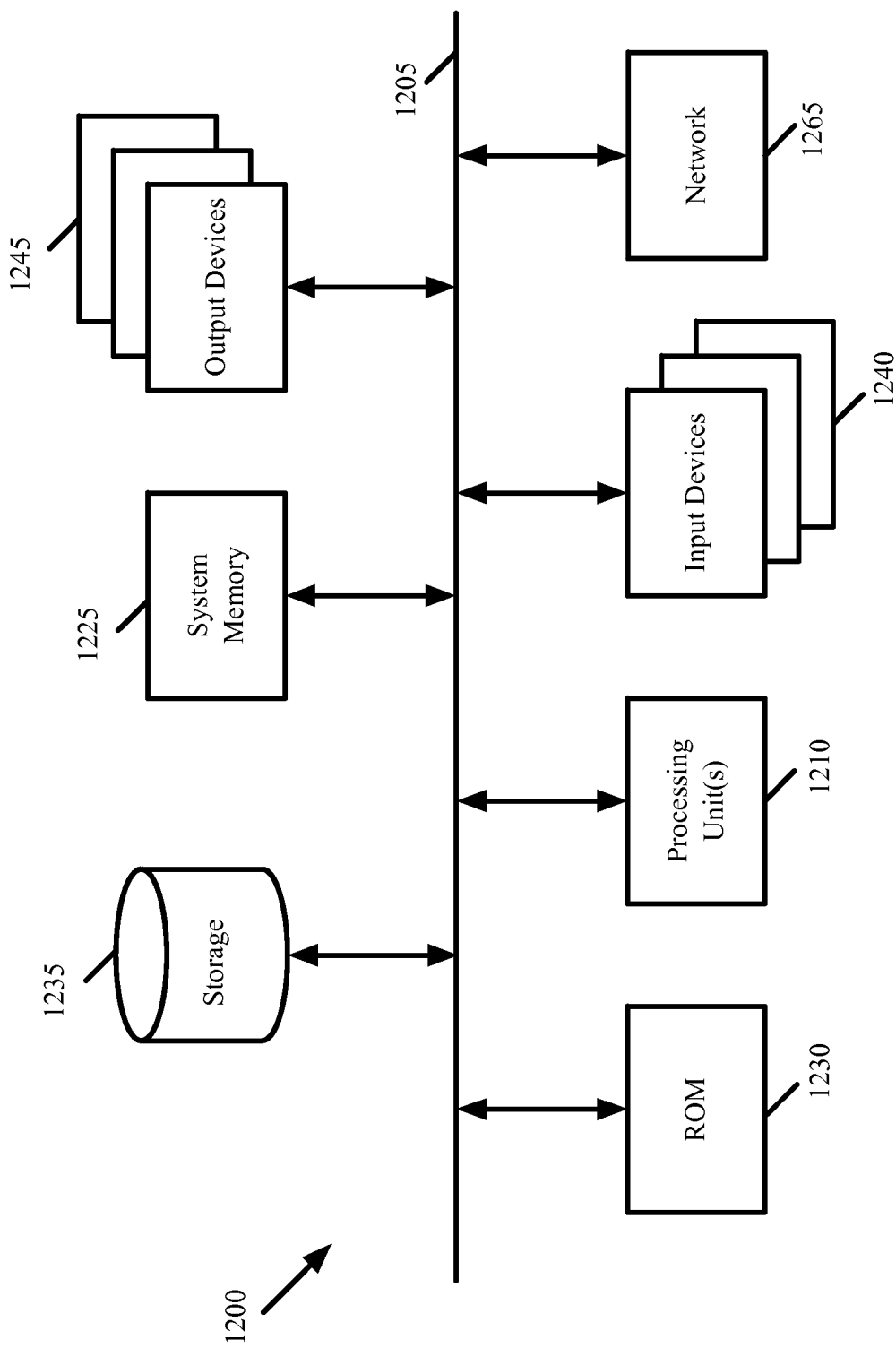
FIG. 12 conceptually illustrates an electronic system with which some embodiments of the invention are implemented.

FIG. 12 conceptually illustrates an electronic system 1200 with which some embodiments of the invention are implemented. The electronic system 1200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chip set buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieve instructions to execute and data to process in order to execute the processes of the invention. The processing unit(s) may be a single processor or a multi-core processor in different embodiments.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device Like the permanent storage device 1235, the system memory 1225 is a read-and-write memory device. However, unlike storage device 1235, the system memory is a volatile read-and-write memory, such a random access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices enable the user to communicate information and select commands to the electronic system. The input devices 1240 include alphanumeric keyboards and pointing devices (also called "cursor control devices"). The output devices 1245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Therefore, one of ordinary skill in the art would understand that the invention is not to be limited by the foregoing illustrative details, but rather is to be defined by the appended claims.

What is claimed is:

1. A method for dynamically determining whether to process an application programming interface (API) request remotely on a server or by a local proxy object that executes on a local device, the method comprising:
   at the local proxy object, receiving the API request from an application executing on the local device, wherein the local proxy object is one of a (i) JavaScript (JS) object constructed from a JS description and a JS OBJECT NOTATION (JSON) description, and (ii) a native proxy object instantiated from an object description received from the server in response to querying the server via an adapter;
   at the local proxy object, determining, based on a set of conditions, whether to (i) direct the server to remotely process the API request or (ii) locally process the API request on the local device;
   when the set of conditions indicates that the API request should be remotely processed, directing a JS object executing on the remote server to process the API request and return a response to the local device; and
   when the set of conditions indicates that the API request should be locally processed, processing, at the local JS object or the local native object, the API request on the local device and returning a response to the application.

2. The method of claim 1, wherein the local JS object on the local device is an isomorphic equivalent of the JS object on the remote server.

3. The method of claim 1, wherein the JS object is instantiated on the remote server based on a JS file that includes a behavioral description of the JS object and a JSON file that includes a property description of the JS object, wherein the JS and JSON files are stored on the remote server.

4. The method of claim 3, wherein the local JS object is instantiated based on a JavaScript/JSON model description that comprises a JS file and a JSON file stored on the local device.

5. The method of claim 4, wherein the JS file and JSON file stored on the remote server are identical to the JS file and JSON file stored on the local device.

6. The method of claim 4, wherein the JS file stored on the local device stores a behavioral description of the local JS object and the JSON file stored on the local device stores a property description of the local JS object.

7. The method of claim 1, wherein said determination comprises an evaluation of the set of conditions based on a hook for the API request that is evaluated prior to the processing of the API request.

8. The method of claim 7, wherein the hook is a function call and the set of conditions comprises a set of parameters to the function call.

9. The method of claim 1, wherein the set of conditions comprises a status of a connection to the remote server.

10. The method of claim 1, wherein the set of conditions comprises a current usage of one of (i) processing resources and (ii) memory resources on the local device.

11. The method of claim 1, wherein the set of conditions comprises an availability of data accessed by the API request on the local device.

12. The method of claim 11, wherein the data stored on the local device is accessed according to a JavaScript/JSON model defined on the local device, wherein the model is also defined on the remote server.

13. The method of claim 1, wherein the API request comprises a request to provide data from a set of data sources, wherein the response sent by the local proxy object to the application comprises the requested data from the set of data sources.

14. A non-transitory machine readable medium storing a program which, when executed by at least one processing unit of a first device, dynamically determines whether to process an application programming interface (API) request remotely on a second device or by a local proxy object that executes on the first device, the program comprising sets of instructions for:
   at the local proxy object, receiving the API request from an application executing on the first device, wherein the local proxy object is one of a (i) JavaScript (JS) object constructed from a JS description and a JS OBJECT NOTATION (JSON) description, and (ii) a native proxy object instantiated from an object description received from the second device in response to querying the second device via an adapter;
   at the local proxy object, determining, based on a set of conditions, whether to (i) direct the second device to remotely process the API request or (ii) locally process the API request on the first device;
   when the set of conditions indicates that the API request should be remotely processed, directing a JS object executing on the second device to process the API request and return a response to the first device; and
   when the set of conditions indicates that the API request should be locally processed, processing, at the local JS object or the local native object, the API request on the first device and returning a response to the application.

15. The non-transitory machine readable medium of claim 14, wherein the second device is a remote API server that processes API requests, wherein the JS object is instantiated on the remote API server from a JS file and an associated JSON file.

16. The non-transitory machine readable medium of claim 15, wherein the JS file includes a behavioral description of the local JS object and the associated JSON file includes a property description of the local JS object.

17. The non-transitory machine readable medium of claim 14, wherein the API request comprises a request to provide data from a set of data sources, wherein the set of instructions for processing the API request and returning the response to the application comprises a set of instructions for receiving, at the local proxy object, the requested data from the set of data sources and returning the data to the application.

18. The non-transitory machine readable medium of claim 17, wherein the JS object on the second device and the local JS object on the first device are isomorphic.

19. The non-transitory machine readable medium of claim 14, wherein the set of instructions for determining comprises a set of instructions for evaluating the set of conditions based on a hook for the API request, wherein said evaluation is performed prior to the processing of the API request.

20. The non-transitory machine readable medium of claim 19, wherein the hook is a function call and the set of conditions comprises a set of parameters to the function call.

21. The non-transitory machine readable medium of claim 14, wherein the set of conditions comprises a status of a connection to the second device.

22. The non-transitory machine readable medium of claim 14, wherein the set of conditions comprises a current usage of one of (i) processing resources and (ii) memory resources on the first device.

23. The non-transitory machine readable medium of claim 14, wherein the set of conditions comprises an availability of data accessed by the API request on the first device.

24. The non-transitory machine readable medium of claim 23, wherein the data is accessed according to a JavaScript/JSON model defined on the first device, wherein the model is also defined on the second device.

25. The non-transitory machine readable medium of claim 14, wherein the local proxy object is instantiated on the first device based on a JavaScript/JSON model description comprising a JS file that stores a behavioral description of the local JS object and a JSON file that stores a property description of the local JS object, wherein the JS and JSON files are stored on the first device.

26. The non-transitory machine readable medium of claim 25, wherein the JS object is instantiated on the second device based on a JS file and a JSON file that are stored on the second device, wherein the JS and JSON files stored on the first device are identical to the JS and JSON files stored on the second device.

27. A first electronic device comprising:
at least one processing unit; and
a non-transitory machine readable medium storing a program which, when executed by the processing unit of the first electronic device, dynamically determines whether to process an application programming interface (API) request remotely on a second device or by a local proxy object that executes on the first device, the program comprising sets of instructions for:
at the local proxy object, receiving the API request from an application executing on the first electronic device, wherein the local proxy object is one of a (i) JavaScript (JS) object constructed from a JS description and a JS OBJECT NOTATION (JSON) description, and (ii) a native proxy object instantiated from an object description received from the second electronic device in response to querying the second electronic device via an adapter;
at the local proxy object, determining, based on a set of conditions, whether to (i) direct the second electronic device to remotely process the API request or (ii) locally process the API request on the first electronic device;
when the set of conditions indicates that the API request should be remotely processed, directing a JS object executing on the second electronic device to process the API request and return a response to the first device; and
when the set of conditions indicates that the API request should be locally processed, processing, at the local JS object or the local native object, the API request on the first electronic device and returning a response to the application.

28. The first electronic device of claim 27, wherein the second electronic device is a remote API server that processes API requests, wherein the JS object is instantiated on the remote API server from a JS file and an associated JSON file.

29. The first electronic device of claim 28, wherein the JS file includes a behavioral description of the local JS object and the associated JSON file includes a property description of the local JS object.

30. The first electronic device of claim 27, wherein the API request comprises a request to provide data from a set of data sources, wherein the set of instructions for processing the API request and returning the response to the application comprises a set of instructions for receiving, at the local proxy object, the requested data from the set of data sources and returning the data to the application.

31. The first electronic device of claim 30, wherein the JS object on the second electronic device and the local JS object on the first electronic device are isomorphic.

32. The first electronic device of claim 27, wherein the set of instructions for determining comprises a set of instructions for evaluating the set of conditions based on a hook for the API request, wherein said evaluation is performed prior to the processing of the API request.

33. The first electronic device of claim 32, wherein the hook is a function call and the set of conditions comprises a set of parameters to the function call.

34. The first electronic device of claim 27, wherein the local JS object is instantiated on the first device based on a JavaScript/JSON model description comprising a JS file that stores the JS description of the local JS object and a JSON file that stores the JSON description of the local JS object.

* * * * *